(12) United States Patent
Garrison

(10) Patent No.: US 9,353,639 B2
(45) Date of Patent: May 31, 2016

(54) WINDBACK DEVICE FOR A CIRCUMFERENTIAL SEAL

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 99 days.

(21) Appl. No.: 14/546,292

(22) Filed: Nov. 18, 2014

(65) Prior Publication Data
US 2015/0069712 A1    Mar. 12, 2015

Related U.S. Application Data

(63) Continuation of application No. 13/707,136, filed on Dec. 6, 2012, now Pat. No. 8,905,408, which is a continuation-in-part of application No. 12/125,133, filed on May 22, 2008, now Pat. No. 8,490,982.

(51) Int. Cl.

| F16J 15/00 | (2006.01) |
|---|---|
| F16J 15/447 | (2006.01) |
| F16J 15/40 | (2006.01) |
| F16J 15/44 | (2006.01) |
| F16J 15/16 | (2006.01) |
| F01D 11/02 | (2006.01) |
| F01D 11/00 | (2006.01) |
| F02C 7/28 | (2006.01) |

(52) U.S. Cl.
CPC ............... *F01D 11/02* (2013.01); *F01D 11/00* (2013.01); *F02C 7/28* (2013.01); *F16J 15/002* (2013.01); *F16J 15/40* (2013.01); *F16J 15/4472* (2013.01); *F01D 11/003* (2013.01); *F05D 2260/60* (2013.01); *F05D 2260/6022* (2013.01); *F16J 15/164* (2013.01); *F16J 15/406* (2013.01); *F16J 15/441* (2013.01)

(58) Field of Classification Search
CPC ..... F16J 15/002; F16J 15/164; F16J 15/3244; F16J 15/40; F16J 15/441; F02C 7/28; D01D 11/02; D01D 11/003
See application file for complete search history.

(56) References Cited

U.S. PATENT DOCUMENTS

| 4,243,230 A | * | 1/1981 | Baker | ................... F16J 15/406 |
| | | | | 277/387 |
| 4,370,094 A | * | 1/1983 | Ambrosch | ............. F01D 11/08 |
| | | | | 415/119 |
| 4,709,930 A | * | 12/1987 | Forch | ................... F16J 15/3244 |
| | | | | 277/430 |

(Continued)

*Primary Examiner* — Kristina Fulton
*Assistant Examiner* — Nicholas L Foster
(74) *Attorney, Agent, or Firm* — Michael Crilly, Esquire

(57) ABSTRACT

The disclosure describes a windback device for a circumferential seal within a turbine engine. The windback device includes an annular collar at one end of an annular fluid seal housing, at least one inclined thread, and a plurality of inclined baffles separately disposed along an outer circumferential surface of a rotatable runner. The housing is adapted at another end for an annular seal. The collar has an opening therethrough sized to receive the runner without contact. The annular seal surrounds and sealingly engages the runner. The threads extend from an inner face of the collar toward the runner. The baffles are separately recessed in or raised above the outer circumferential surface of the runner. The baffles are interposed between the runner and threads. Each baffle is separated from the threads via a radial clearance. Threads and baffles direct lubricant away from the annular seal.

18 Claims, 14 Drawing Sheets

(56) References Cited

U.S. PATENT DOCUMENTS

| | | | | |
|---|---|---|---|---|
| 5,451,066 A * | 9/1995 | Totain | ............... | F16J 15/406 277/347 |
| 8,074,995 B2 * | 12/2011 | Vasagar | ............... | F16J 15/3244 277/301 |
| 8,342,534 B2 * | 1/2013 | Vasagar | ............... | F16J 15/3244 277/399 |
| 8,356,819 B2 * | 1/2013 | Vasagar | ............... | F16J 15/3244 277/399 |
| 8,408,554 B2 * | 4/2013 | Vasagar | ............... | F16J 15/3244 277/301 |
| 8,408,556 B2 * | 4/2013 | Vasagar | ............... | F16J 15/3244 277/399 |
| 8,490,982 B2 * | 7/2013 | Roche | ............... | F01D 11/02 277/411 |
| 8,573,602 B2 * | 11/2013 | Payne | ............... | F16J 15/3224 277/559 |
| 8,616,554 B2 * | 12/2013 | Vasagar | ............... | F16J 15/3244 277/305 |
| 8,820,752 B2 * | 9/2014 | Garrison | ............... | F01D 11/003 277/579 |
| 8,905,408 B2 * | 12/2014 | Garrison | ............... | F01D 11/02 277/348 |
| 9,194,424 B2 * | 11/2015 | Garrison | ............... | F16C 32/0607 |
| 2008/0157479 A1 * | 7/2008 | Vasagar | ............... | F16J 15/441 277/400 |
| 2010/0109252 A1 * | 5/2010 | Matsui | ............... | F16J 15/3244 277/559 |
| 2010/0276893 A1 * | 11/2010 | Jewess | ............... | F16J 15/164 277/424 |
| 2011/0049809 A1 * | 3/2011 | Garrison | ............... | F01D 25/183 277/304 |
| 2011/0215529 A1 * | 9/2011 | Garrison | ............... | F01D 25/183 277/300 |
| 2013/0249170 A1 * | 9/2013 | Sedlar | ............... | F16J 15/3244 277/549 |
| 2015/0049968 A1 * | 2/2015 | Garrison | ............... | F16C 32/0607 384/115 |
| 2016/0053808 A1 * | 2/2016 | Garrison | ............... | F16C 32/0607 384/115 |

* cited by examiner

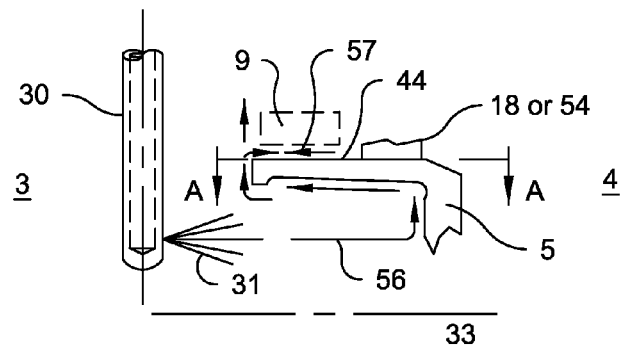
Fig. 11a
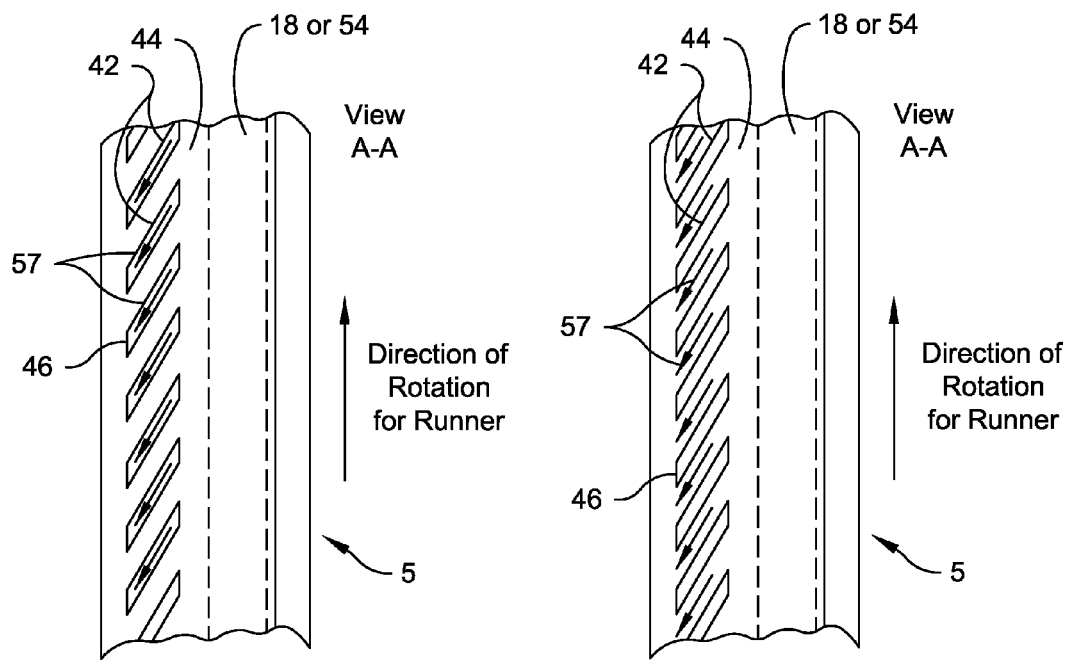
Fig. 11b  Fig. 11c

WINDBACK DEVICE FOR A CIRCUMFERENTIAL SEAL

CROSS REFERENCE TO RELATED APPLICATIONS

This application is a continuation application of co-pending U.S. Non-Provisional application Ser. No. 13/707,136 entitled Windback Device for a Circumferential Seal filed Dec. 6, 2012 which is a continuation-in-part of U.S. Non-Provisional application Ser. No. 12/125,133 entitled Windback Device filed May 22, 2008 now U.S. Pat. No. 8,490,982 issued Jul. 23, 2013. The subject matter of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a sealing device for turbine engines. Specifically, the invention is directed to an annular-shaped windback disposed about a rotatable runner with a plurality of angled or inclined baffles along the outer diameter surface of the runner so that the baffles are interposed between the runner and the windback. The baffles and windback are positioned between a lubricant sump and a shaft seal so as to prevent lubrication fluid from reaching the seal and entering the gas side of a turbine engine.

2. Background

A lubricant sump is frequently required along a rotatable shaft to properly lubricate shaft bearings and the like. It is frequently desirable to isolate the lubricant sump from remaining media in which the shaft is immersed, as well as to assure that the lubricant remains in the sump so that lubrication of the bearings is continuous and the lubricant does not contaminate any other media in which the shaft is immersed.

In gas turbine applications, the lubricant sump is typically isolated from the remainder of the gas turbine housing by the sump housing and a shaft seal. The remainder of the gas turbine housing, or a compartment adjacent thereto, is typically filled with gases at temperatures and pressures higher than those desired in the lubricant sump. It is often important to prevent lubricant from mixing with gas contained in such high temperature gas and/or pressurized compartments. For example, when an oil lubricant is used, mixing between the oil and the gas could result in formation of oil coke, which is a byproduct of oil heated to an elevated temperature and which chemically alters the oil and hence is detrimental to the gas turbine. Oil coke can foul seal surfaces and prevent proper bearing lubrication. Accordingly, it is important in many applications that the lubricant be isolated within a lubricant sump.

To accomplish such sump isolation, a shaft seal is normally positioned adjacent to the sump and around a rotatable shaft passing therethrough. While the sump is typically at a lower pressure than the remainder of the turbine, research has shown that pressure differentials within the sump are such that lubricants held within the sump are encouraged to travel along the rotating shaft toward the seal. These pressure differentials, along with shaft windage, tend to move the lubricant out of the sump and along the shaft, a phenomenon often termed lubricant splash, which results in loss of lubricant from the lubricant sump.

Some sealing means, such as the shaft seal, are normally provided to at least minimize if not prevent lubricant splash and lubricant loss. However, the shaft seal, which typically is a segmented carbon rubbing seal, may have the carbon sealing faces contaminated by the lubricant if the lubricant reaches the seal. Such contamination of the seal can compromise the integrity of the seal and reduce the efficiency with which the seal isolates the lubricant within the lubricant sump.

To prevent lubricant from reaching the carbon sealing faces or other parts of the seal, a windback device is typically interposed along the shaft, between the seal and the lubrication sump. The windback device normally has an annular collar-like member, receiving the shaft in the opening of the collar-like member, and a screw pitch or thread in the radially inward surface of the collar-like member that faces the shaft. The windback device is typically secured to the housing to prevent lubricant leakage from the sump to the remainder of the housing except along the shaft. The shaft seal is normally interposed between the windback device and the shaft, with the seal located along the shaft, on the side of the windback device that is remote from the sump in order to prevent lubricant leakage along the shaft.

Since a windback device is typically in close proximity to the associated shaft, yet not so close as to expect to create a pressure drop along the shaft, initial conventional wisdom was that pressure along the opening in the windback device, namely at positions in the windback device opening that were adjacent to the rotating shaft, would be essentially constant along the length of the shaft within the windback device. As a result of this assumption, conventional wisdom has been that any lubricant splash moving along the shaft of the windback device would likely flow back toward the sump along the threaded inner surface of the windback collar.

Contrary to conventional wisdom, pressure measurements taken along the axial length of the windback device have shown a pressure drop between the sump and the end of the windback device remote from the sump. Measured pressure at the sump end of the windback opening was actually greater than measured pressure at the seal end of the windback opening. Thus, the pressure differential encourages lubricant to move away from the sump along the shaft to other interior portions of the shaft housing.

In applications such as gas turbines, the pressure of the lubricant medium in regions other than in the sump is higher than the pressure within the sump. Thus, one would expect that the lubricant pressure in the sump, adjacent to the seal, would be higher than the lubricant pressure in the remainder of the sump. However experiments have shown that, even in such applications, the pressure in the sump adjacent to the seal was lower than the pressure in the remainder of the sump, thus causing additional lubricant flow along the shaft towards the seal. Because of this unexpected pressure profile, windback devices prior to the aforementioned research failed to adequately prevent the flow of lubricant toward the seal.

Maier addresses the flow of a lubricant toward a seal in U.S. Pat. No. 5,322,298 entitled Shaft Seal. Specifically, Maier discloses a windback with first and second annular grooves disposed along the bore of a seal element. The annular grooves are perpendicular to the plane of the shaft and are spaced such that the first annular groove defines a distal end of the windback relative to the lubricant sump and the second annular groove is at a proximal end of the windback relative to the lubricant sump. Threads extend along the windback bore at an oblique angle, relative to the longitudinal axis of the shaft, between the first and second annular grooves. In operation, lubricant drops entering between the windback and the shaft are deposited into the oblique threads by the windage drag. The shearing stress caused by the rotation of the shaft forces the fluid to move along the oblique threads and into the annular grooves. However, there is no leak-off slot to release buildup of fluid from the annular grooves. As such, fluid can accumulate within the grooves thereby decreasing the pumping efficiency of the windage and frustrating reintroduction of lubricant into the space between the shaft and the windage.

McNickle addresses the flow of a lubricant toward a seal in U.S. Pat. No. 5,503,407 entitled Windbacks for Rotating Shafts. Specifically, McNickle discloses a windback as part of a circumferential seal assembly within a lubricant sump. The windback includes an internal helical thread machined on the bore of the housing, wherein, a shaft passes through and rotates within the bore. When the shaft rotates, windage results in a clearance between the windback and the shaft. Lubricant droplets entering between the windback and shaft clearance from the lubricant side are, thereby, forced on the helical thread due to the effect of windage drag. The lubricant droplets are further forced by the shearing stress on the thread surface to move circumferentially along the helical thread to a single windback bleed-off slot wherein the lubricant is returned to the lubricant sump. The helical thread requires the lubricant droplets to travel several times around the circumferential distance defined by the helical thread to the singular leak-off slot before dropping into the lubricant side. Ultimately, the circumferential distance around the windback helical thread combined with only one leak-off slot decreases the ability of the helical thread to efficiently pump the lubricant back into the sump. The additional distance and single leak-off slot also increases the risk that the windback will clog or back up with lubricant, reducing efficiency of the helical thread.

Roche et al. addresses the flow of a lubricant toward a seal in U.S. patent Ser. No. 12/125,133 entitled Windback Device. Specifically, Roche et al. discloses a windback including an annular collar extending from a seal housing and substantially surrounding a shaft. Along an inner face of the collar are a series of channels that are adapted to form between one or more inclined threads of either the same or varying dimensions. The threads preferably extend across the length of the collar at an oblique angle, relative to the axis of the runner. At an end of each thread, proximal to the lubricant sump and distal to the seal housing, is a leak-off slot leading to the lubricant sump. The windback is positioned over the shaft such that the collar substantially surrounds the shaft, affording the windback optimal radial clearance as respecting the distance between the ridges and the shaft. Specifically, the radial clearance is such that the inclined threads receive lubricant deposited thereon by windage resulting from rotation of the shaft. The radial clearance allows shear forces generated by rotation of the shaft to move the lubricant along the threads and through the leak-off slots of each thread. In operation, lubricant within the lubricant sump travels into the radial clearance between the shaft and the windback. Rotation of the shaft creates windage that splashes the lubricant into the threads of the windback. Sheer forces created by rotation of the shaft urge the lubricant along the threads such that the lubricant moves away from the seal and the seal housing, through the leak-off slots. Accordingly, the windback returns the lubricant back to the lubricant sump and prevents the lubricant from contacting the seal.

The devices described by Maier, McNickle, and Roche et al. employ various mechanisms to redirect fluid into a sump after entering the space between a windback and a shaft. However, such mechanisms alone are not always sufficient to prevent oil from reaching a seal and thereafter leaking into the gas side of a turbine engine.

Accordingly, what is required is a windback device for a circumferential seal capable of redirecting fluid into a sump after entering the space between a windback and a runner.

SUMMARY OF THE INVENTION

An object of the invention is to provide a windback device for a circumferential seal capable of redirecting fluid into a sump after entering the space between a windback and a runner.

In accordance with embodiments of the invention, the windback device includes an annular collar at a first end of an annular fluid seal housing, at least one thread defining at least one inclined thread, and a plurality of inclined baffles separately disposed along an outer circumferential surface of a rotatable runner. The annular fluid seal housing is adapted at a second end for an annular seal. The annular collar has an opening therethrough which is sized to receive the rotatable runner without contact. The annular seal is sized to surround and sealingly engage the rotatable runner. Each inclined thread separately extends from an inner face of the annular collar toward the rotatable runner and is oriented along the inner face at a pitch angle with respect to rotation of the rotatable runner. One inclined thread could overlap itself or another inclined thread at least partially circumferentially about the bore of the annular collar. The inclined baffles are separately disposed along an outer circumferential surface of the rotatable runner. The inclined baffles are interposed at least partially between the rotatable runner and the inclined threads. Each inclined baffle either is recessed into or extends from the outer circumferential surface. Each inclined baffle has a first end and a second end and is further oriented at a baffle angle with respect to rotation of the rotatable runner. Each inclined baffle is separated from the threads via a radial clearance. Both inclined threads and inclined baffles assist moving lubricant away from the annular seal.

In accordance with other embodiments of the invention, the windback device further includes a plurality of inclined grooves separately disposed along the outer circumferential surface of the rotatable runner. The inclined grooves are interposed at least partially between the rotatable runner and the annular seal. The annular seal is a ring-shaped element which contacts and is movable with respect to the annular fluid seal housing. Each inclined groove has an inlet end and an outlet end and is further oriented at a groove angle with respect to rotation of the rotatable runner. The inclined grooves form a thin-film seal between the annular seal and the rotatable runner during rotation of the rotatable runner.

In accordance with other embodiments of the invention, the windback device further includes a plurality of labyrinth teeth disposed along and separately extending outward radially from the outer circumferential surface of the rotatable runner. The labyrinth teeth are interposed between the rotatable runner and the annular seal. The labyrinth teeth form a seal along the annular seal which is attached to the annular fluid seal housing and extends therefrom substantially parallel to the rotatable runner.

In accordance with other embodiments of the invention, the windback device further includes at least one hole radially through the annular fluid seal housing. Each hole is interposed between the inclined threads and the annular seal.

In accordance with other embodiments of the invention, the windback device is configured so that each inclined thread includes a leak-off slot along the annular collar.

In accordance with other embodiments of the invention, the windback device is configured so that at least two first ends are equidistant from a vertical end along the rotatable runner.

In accordance with other embodiments of the invention, the windback device is configured so that at least two first ends are non-equidistant from a vertical end along the rotatable runner.

In accordance with other embodiments of the invention, the windback device is configured so that at least two second ends are equidistant from a vertical end along the rotatable runner.

In accordance with other embodiments of the invention, the windback device is configured so that at least two second ends are non-equidistant from a vertical end along the rotatable runner.

In accordance with other embodiments of the invention, the windback device is configured so that at least two inlet ends are equidistant from a vertical end along the rotatable runner.

In accordance with other embodiments of the invention, the windback device is configured so that at least two inlet ends are non-equidistant from a vertical end along the rotatable runner.

In accordance with other embodiments of the invention, the windback device is configured so that at least two outlet ends are equidistant from a vertical end along the rotatable runner.

In accordance with other embodiments of the invention, the windback device is configured so that at least two outlet ends are non-equidistant from a vertical end along the rotatable runner.

In accordance with other embodiments of the invention, the windback device is configured so that the pitch angle is equal to the baffle angle.

In accordance with other embodiments of the invention, the windback device is configured so that the pitch angle is not equal to the baffle angle.

In accordance with other embodiments of the invention, the windback device is configured so that the groove angle is equal to the baffle angle.

In accordance with other embodiments of the invention, the windback device is configured so that the groove angle is not equal to the baffle angle.

During operation of a turbine engine, lubricant within the lubricant sump travels into the radial clearance between the runner and the windback. Rotation of the shaft causes the lubricant to move into the threads of the windback. Sheer forces created by rotation of the shaft urge the lubricant along the threads such that the lubricant moves away from the annular seal and the seal housing and into and through the leak-off slots. Furthermore, the windage generates a pumping action within the inclined baffles when recessed along the runner or between adjacent inclined baffles when extending above the runner so as to move or push lubricant away from the annular seal and the seal housing and into and through the leak-off slots. Accordingly, the windback device returns the lubricant back to the lubricant sump and prevents the lubricant from contacting the annular seal.

In one of its aspects, the invention utilizes both surfaces disposed about a clearance between a seal housing and a rotatable runner to minimize accumulation of a lubricant therein.

In another of its aspects, the invention allows for a robust and efficient counter flow which mitigates movement of a lubricant toward and contact with an annular seal.

In another of its aspects, the invention allows for a robust and efficient counter flow which mitigates leakage of a lubricant across an annular seal along a circumferential seal.

In another of its aspects, the invention allows for a robust and efficient counter flow which mitigates lubricant leakage from a low pressure area, e.g. a lubricant sump of a turbine engine, to a high pressure area, e.g. a gas side of a turbine engine.

In another of its aspects, the invention allows for a robust and efficient counter flow which redirects flow of a lubricant along a shaft back into a lubricant sump while reducing buildup of the lubricant within the windback.

The above and other objectives, features, and advantages of the embodiments of the invention will become apparent from the following description read in connection with the accompanying drawings, in which like reference numerals designate the same or similar elements.

REFERENCE NUMERALS

| | |
|---|---|
| 1 | Sump housing |
| 2 | Shoulder |
| 3 | Lubricant side |
| 4 | Gas side |
| 5 | Rotatable runner |
| 6 | Bearing assembly |
| 7 | Fluid seal assembly |
| 8 | Annular fluid seal housing |
| 9 | Windback |
| 10 | Hole |
| 11 | Annular collar |
| 12 | Annular seal cavity |
| 13 | Annular flange |
| 14 | Bolt |
| 15 | Sealing mechanism |
| 16 | Recess |
| 17 | Seal-receiving groove |
| 18 | Annular seal |
| 19 | Seal cavity wall |
| 20 | Recess |
| 21 | Coil spring |
| 22 | Seal support ring |
| 23 | Retaining ring |
| 24 | Compression spring |
| 25 | Bore-like opening |
| 26 | Inner face |
| 27 | Inclined thread |
| 28 | Channel |
| 29 | Radial clearance |
| 30 | Injection nozzle |
| 31 | Lubricant |
| 32 | Shaft |
| 33 | Rotational axis |
| 34 | Recess |
| 35 | Leak-off slot |
| 36 | Inlet width |
| 37 | Outlet width |
| 38 | Hole |
| 39 | Circumference |
| 40 | Flow arrow |
| 41 | Pitch angle |
| 42 | Inclined baffle |
| 43 | Vertical end |
| 44 | Outer circumferential surface |
| 45 | First end |
| 46 | Second end |
| 47 | Baffle angle |
| 48 | Radial clearance |
| 49 | Inclined groove |
| 50 | Inlet end |
| 51 | Outlet end |
| 52 | Groove angle |
| 53 | Labyrinth tooth |
| 54 | Annular seal |
| 55 | Gap |

-continued

| 56 | Flow |
| 57 | Counter flow |
| 58 | Radial clearance |
| 59 | Inner surface |
| 60 | Coating |

BRIEF DESCRIPTION OF THE DRAWINGS

Additional aspects, features, and advantages of the invention will be understood and will become more readily apparent when the invention is considered in the light of the following description made in conjunction with the accompanying drawings.

FIG. 11a is a cross section view illustrating exemplary flow and counter flow patterns for a lubricant along a rotatable runner with inclined baffles along the outer circumferential surface of the rotatable runner adjacent to a windback (not illustrated) in accordance with an embodiment of the invention.

FIG. 11b is a view illustrating exemplary counter flow patterns for the lubricant across the rotatable runner in FIG. 11a when the inclined baffles are recessed along the outer circumferential surface in accordance with an embodiment of the invention.

FIG. 11c is a view illustrating exemplary counter flow patterns for the lubricant across the rotatable runner in FIG. 11a when the raised inclined baffles extend above the outer circumferential surface in accordance with an embodiment of the invention.

DETAILED DESCRIPTION OF THE INVENTION

Figure 1:
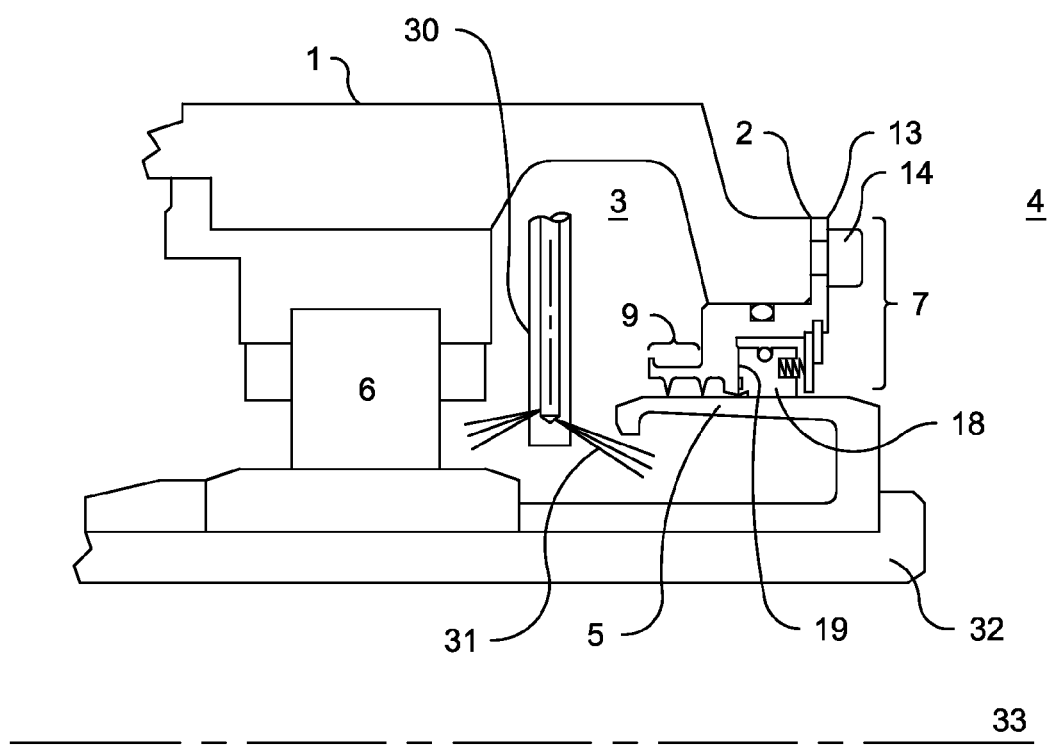
FIG. 1 is a cross-sectional view illustrating a sump housing, a seal assembly, a rotatable runner, and a bearing generally defining a sump chamber.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

The present invention relates to an apparatus for preventing leakage of a lubricant from a lubricant sump within a turbine engine. More specifically, the invention includes an annular fluid seal containing a windback device, often referred to a windback positioned within a sump housing, which may be positioned between a high pressure area and a low pressure area. Preferably, the windback is positioned around a rotating shaft that extends between the high and low pressure areas so as to isolate a lubricant sump. One or more inclined threads are formed on an inner face of the windback and are angled such that lubricant or other fluid splashed from the rotating shaft is directed away from a shaft sealing element of the annular fluid seal and through leak-off slots leading to the sump housing chamber. A plurality of inclined baffles are formed on an outer face of a runner rotatable immediately adjacent to the windback. The baffles are angled so as to pump air and/or lubricant across the windback and back into the sump side. Accordingly, the windback design of the present invention avoids leakage out of the isolated sump by way of the rotating shaft.

Figure 2:
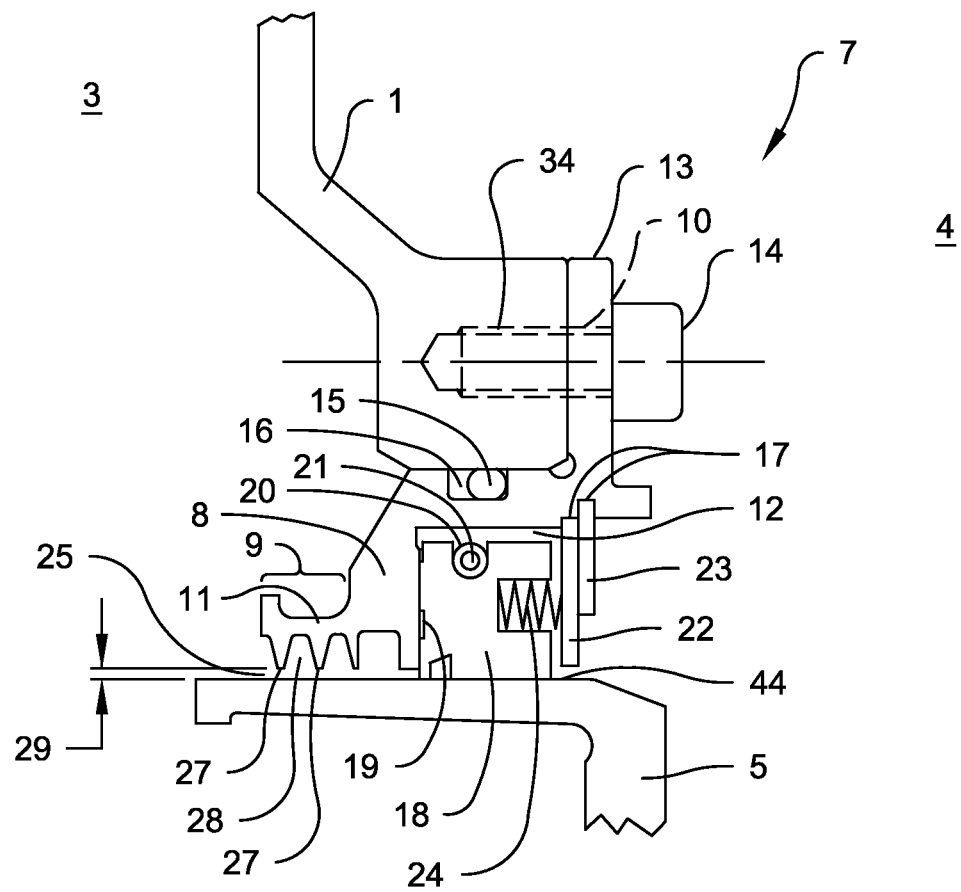
FIG. 2 is an enlarged section view illustrating a circumferential seal disposed about a rotatable runner with a windback element adjacent to a sump chamber or lubricant side and an annular seal adjacent to a gas side.

Referring now to FIGS. 1 and 2, a portion of an exemplary turbine engine is illustrated as containing a windback 9. The windback 9 is disposed within a sump housing 1 immediately adjacent to a rotatable runner 5, a bearing assembly 6, and a fluid seal assembly 7. The sump housing 1 is of an annular configuration substantially surrounding the rotatable runner 5 which passes through an open end of the sump housing 1. The sump housing 1 is provided with a necked-down portion and a shoulder 2 adapted to be coupled to the annular-shaped fluid seal assembly 7 such that the fluid seal assembly 7 substantially seals the area around the rotatable runner 5 and the open end of the sump housing 1. One or more bearing assemblies 6 interface between the sump housing 1 and the rotatable runner 5. The bearing assemblies 6 could include conventional ball bearings or any bearing understood in the art to support rotation of the rotatable runner 5. The sump housing 1, rotatable runner 5, fluid seal assembly 7, and bearing assemblies 6 are all coupled so as to form a lubricant sump or sealed chamber, referred to here as the lubricant side 3, which is preferably a low pressure area containing a lubricating fluid, one non-limiting example being oil. A lubricant 31 could be applied onto the rotatable runner 5 via one or more injection nozzles 30, communicating with a pump (not illustrated), which spray the lubricant 31 into the lubricant side 3. In some embodiments, the rotatable runner 5 could include or be attached to a shaft 32 rotatable about a centerline along the longitudinal axis of a turbine engine, otherwise referred to as the rotational axis 33. In other embodiments, a rotatable runner 5 could be an integral part of a shaft 32.

In some embodiments, the lubricant side 3 separates the lubricant 31, e.g. oil, from a high temperature and/or high pressure gaseous environment. For example, in the context of gas turbine applications, e.g. aircraft engines, it is important to prevent an oil lubricant from mixing with the high temperature gases present at the exterior side of the sump housing 1 and proximal to the fluid seal assembly 7. Typically, such high temperature/high pressure gases are contained within a chamber (not illustrated) on a gas side 4 of the turbine. Mixing of oil and hot gases could cause oil cooking and an engine fire. Accordingly, the present invention isolates a lubricant 31 within the lubricant side 3 and utilizes an annular seal 18, a windback 9 on the fluid seal assembly 7, and features along a rotatable runner 5 to prevent the lubricant 31 from escaping along a path between the rotatable runner 5 and the fluid seal assembly 7.

The fluid seal assembly 7 could include an annular fluid seal housing 8 flanked by an annular flange 13 at one end and a windback 9 at another end. The annular fluid seal housing 8 is adapted to receive and sealingly engage the rotatable runner 5. Extending from one end of the annular fluid seal housing 8 is an annular flange 13. The annular flange 13 extends radially outward from the fluid seal assembly 7 and is also adapted to substantially surround the rotatable runner 5. The annular flange 13 contacts the shoulder 2 of the sump housing 1 when the fluid seal assembly 7 is attached to the sump housing 1. In some embodiments, the shoulder 2 of the sump housing 1 and the annular flange 13 are adapted to be coupled to one another. For example, referring to FIG. 2, a plurality of recesses 34 in the annular fluid seal housing 8 align with a plurality of holes 10 in the annular flange 13 to facilitate coupling of the annular flange 13 to the shoulder 2. Specifically, the annular flange 13 could be coupled to the shoulder 2 by a plurality of bolts 14 each separately passing through a hole 10 along the annular flange 13 and threadingly engaging a recess 34 in the shoulder 2 of the sump housing 1. However, the invention is not limited to this embodiment and the annular flange 13 may be coupled to the shoulder 2 by a screw, clasp, strap, or any other means understood in the art to secure the annular flange 13 to a shoulder 2. Moreover, the invention is not limited to a recess 34 within the shoulder 2. Rather, the shoulder 2 may also comprise a hook, screw, bolt or the like extending therefrom wherein the hook, screw, bolt, etc. is each adapted to pass through a hole 10 in the annular flange 13. An external means such as a nut, clasp, strap, retention ring, or the like may then be utilized to further secure the annular flange 13 to the shoulder 2. Regardless of the type of securing mechanism, the action of securing the annular flange 13 to the shoulder 2 functions to secure the fluid seal assembly 7 to the sump housing 1.

Referring again to FIG. 2, the annular fluid seal housing 8 contains a sealing mechanism 15 such as, but not limited to, an O-ring, or other similar sealing ring, located within a groove or recess 16 about the annular fluid seal housing 8. The recess 16 and sealing mechanism 15 extend along the annular fluid seal housing 8 such that, when the fluid seal assembly 7 is secured to the sump housing 1 by way of the annular flange 13, the sealing mechanism 15 sealingly engages an aspect of the shoulder 2. This sealing engagement of the sealing mechanism 15 prevents leakage of a lubricant 31 within lubricant side 3 through the space between the annular fluid seal housing 8 and sump housing 1.

The annular fluid seal housing 8 is adapted to form a bore passing substantially through the center of the annular fluid seal housing 8 and leading to an annular seal cavity 12. The bore is sized to receive and allow the rotatable runner 5 to pass therethrough and the annular seal cavity 12 is adapted to receive a seal assembly. More specifically, the annular fluid seal housing 8 extends radially around the rotatable runner 5 so as to form an annular seal cavity 12 containing a plurality of radial seal-receiving grooves 17 proximal to the annular flange 13. Based on the foregoing, the annular sealing cavity 12 and seal-receiving grooves 17 extend co-axially with the annular fluid seal housing 8 such that the annular seal cavity 12 and stepped seal-receiving grooves 17 substantially surround the rotatable runner 5 and are adapted to receive one or more segments of an annular sealing ring. The resulting diameter of the annular seal cavity 12 may be of any diameter understood in the art to support a sealing assembly and, ultimately, to seal the lubricant side 3 within the sump housing 1. However, in a non-limiting example, the diameter created by the seal annular cavity 12 is such that it is larger than the diameter of the space created by the windback 9.

In some embodiments, an annular seal 18 is adapted to fit within the annular seal cavity 12 such that the annular seal 18 is held in place by both a seal cavity wall 19 and the stepped seal-receiving grooves 17. More specifically, the annular seal 18 may fit within the annular seal cavity 12 such that it substantially surrounds the rotatable runner 5 and isolates the fluid within lubricant side 3. The annular seal 18 is a ring shaped-element consisting of one or more segments. The annular seal 18 could provide a contact seal or a non-contact seal via hydrostatic or hydrodynamic means understood in the art. In one example, the annular seal 18 may be comprised of a plurality of segmented seal rings (not illustrated) wherein the segments are coupled together forming a ring which expands under certain rotational conditions. In another example, the annular seal 18 may be a ring-shaped element bisected by a cut along one side which allows the ring to expand when subjected to certain rotational conditions. The annular seal 18 could be formed from carbon or carbon-graphite or any material understood in the art for a sealing surface within a chamber and along a rotatable runner 5 or other shaft-related element. The annular seal 18 could have an outer diameter slightly smaller than the outer diameter of the annular seal cavity 12 and an inner diameter that is approximately the same diameter as or slightly larger than the outer diameter of the rotatable runner 5. Along the outer diameter of the annular seal 18 is a recess 20. The recess 20 is adapted to receive a device that mechanically urges the annular seal 18 against the surface of the rotatable runner 5. In a non-limiting example, the device may be comprised of a circular coil spring 21 which serves to urge the annular seal 18 against the rotatable runner 5, while not inhibiting the rotation of the rotatable runner 5 yet still allowing the annular seal 18 to expand or contract with the rotatable runner 5 as necessary. For example, the coil spring 21 may be adapted to allow an annular seal 18 which is segmented or cut to expand during rotation of the rotatable runner 5. This expansion allows for an air bearing around the rotatable runner 5 and between the expanded annular seal 18 and the rotatable runner 5. The present invention, however, is not limited to a coil spring 21 and may be comprised of any device understood in the art to bias or urge seal segments against the rotatable runner 5 and/or provide a similar air bearing design.

Isolating and sealing the lubricant side 3 are further enhanced by biasing the annular seal 18 against a seal cavity wall 19. Specifically, a seal support ring 22 may be positioned within the annular seal cavity 12 such that the seal support ring 22 is fixed in position by one of the stepped seal-receiving grooves 17. The seal support ring 22 may be further fixed by a retaining ring 23, desirably a split retaining ring, which is received within another of the stepped seal-receiving grooves 17. As illustrated in FIG. 2, it is desirable that the seal support ring 22 and the retaining ring 23 are affixed within adjacent stepped seal-receiving grooves 17 such that the retaining ring 23 biases the seal support ring 22 toward the annular seal 18 and the interior of the annular seal cavity 12. The seal support ring 22 mechanically urges the annular seal 18 against a seal cavity wall 19 proximal to the windback 9 through a plurality of compression springs 24. For example, the annular seal 18 may be urged toward the seal cavity wall 19 by a series of compression springs 24. Each compression spring 24 may extend from a series of pockets or a long continuous groove (not illustrated) along the annular seal 18 to, ultimately, contact the seal support ring 22. The fixed position of the seal support ring 22 and the retaining ring 23 urges the seal against the seal cavity wall 19 by way of the action of the series of compression springs 24 retained therebetween. Embodiments of the invention are not limited in the number of compression springs 24 utilized; however, it is desirable that a sufficient number of compression springs 24 be utilized to evenly compress the one or more segments of the annular seal 18 against the seal cavity wall 19 without hindering the ability of the annular seal 18 to isolate the chamber 3.

The result of biasing segments comprising the annular seal 18 toward the rotatable runner 5 and the seal cavity wall 19 is to increase the efficiency of the annular seal 18. In other words, the action of the mechanical device, e.g. the coil spring 21, urging the seal segments toward the rotatable runner 5 functions to tighten the seal segments around the rotatable runner 5 and prevent lubricant 31 from passing between the rotatable runner 5 and the annular seal 18 during non-operation, while facilitating the initiation of an air bearing between the annular seal 18 and the rotatable runner 5 during operation of the engine. Furthermore, the action of the seal support ring 22, the retaining ring 23 and the compression springs 24 function to bias the annular seal 18 against the seal cavity wall 19 proximal to the windback 9. The effect of this is to contact the annular seal 18 with the seal cavity wall 19 so as to prevent the lubricant 31 from leaking between the annular seal 18 and the annular fluid seal housing 8 during both non-operation and operation of the turbine engine.

The annular fluid sealing housing 8 and annular seal cavity 12 as described herein are intended only for illustrative purposes. To this end, the present invention is not limited to the above configuration. The annular fluid seal housing 8 and annular seal cavity 12 may be in any similar configuration understood in the art to bias a seal within a housing cavity so as to ensure isolation of a lubricant 31 or other fluid within the chamber along a lubricant side 3.

Referring again to FIGS. 1 and 2, the windback 9 is a part of the circumferential seal imposed by the fluid seal assembly 7. More specifically, the windback 9 is comprised of an annular collar 11, forming a bore-like opening 25 therethrough that is adapted to receive the rotatable runner 5 within.

Referring now to FIGS. 2 and 3a-3c, the inner face 26 of the annular collar 11, which faces the rotatable runner 5, is provided with one or more inclined threads 27 formed by one or more channels 28 spaced about the inner face 26 of the annular collar 11 extending from the annular fluid seal housing 8 substantially parallel to the rotatable runner 5. Specifically, the channels 28 are adapted to form a plurality of inclined threads 27 extending at oblique angles, relative to the longitudinal axis of the rotatable runner 5, and spaced along the inner face 26 of the windback 9, embodiments of which are described by Roche et al. in U.S. patent application Ser. No. 12/125,133 entitled Windback Device which is incorporated in its entirety herein by reference thereto.

Preferably, the channels 28 form inclined threads 27 that extend from an end of the windback 9 proximal to the annular seal cavity 12 to an opposing end of the windback 9 distal to the annular seal cavity 12. The depth, width, taper of the channel 28 and pitch angle 41 of the inclined threads 27 may be adjusted based on the particular application of the windback 9. Specifically, these measurements may be tailored based on factors such as the speed of rotation of the rotatable runner 5, engine operating conditions, pressure, temperature, flow velocity of the lubricant or similar parameters which affect the windage, shear forces, and/or flow of the lubricant to optimize the efficiency of the multiple inclined threads 27. At the sump end of each inclined thread 27, there is provided a radially extending leak-off slot 35. Each leak-off slot 35 assists in directing the lubricant 31 as it leaves the inclined thread 27 back to the lubricant side 3. To this end, the inclined threads 27 urge the lubricants 31 away from the face of the annular seal 18 and toward the leak-off slots 35.

A leak-off slot 35 is generally a cut out along the circumferential edge of an annular collar 11 between adjacent inclined threads 27 and could at least partially traverse the distance between two adjacent inclined threads 27. In some embodiments, it might be advantageous for the widths of leak-off slots 35 to differ for two or more channels 28.

Referring again to FIG. 2, the radial clearance 29 for the windback 9 is the clearance distance between the outer circumferential surface 44 of the rotatable runner 5 and the innermost edge of the inclined threads 27 along the windback 9, when the seal assembly 7 is coupled to the shoulder 2. Generally, the radial clearance 29 is determined by the engine shaft radial run-out, relative to the inside diameter of the windback 9, and material thermal expansion rates. Optimal radial clearance 29 is, therefore, dependent upon, at least, the diameter of the rotatable runner 5 and the pressure created by windage or sheer forces from the rotation of the rotatable runner 5. However, other considerations to determining a proper radial clearance 29 include fluid flow coefficients, flow factors, Reynolds Number, wetted parameters, fluid properties, shaft velocity, cross sectional flow area, groove width and depth, and the rotating surface area. Taking each of these factors into consideration, the preferred radial clearance 29 is a distance wherein the inclined thread 27 of the windback 9 may still receive lubricant 31 deposited therein by windage resulting from rotation of the rotatable runner 5 and the resulting shearing forces created by the rotation of the rotatable runner 5 force the fluid to travel along the inclined threads 27 toward the leak-off slots 35. As such, the desired radial clearance 29 is static only for a given application, and may be varied in accordance with the foregoing parameters for each unique application.

Figure 3A:
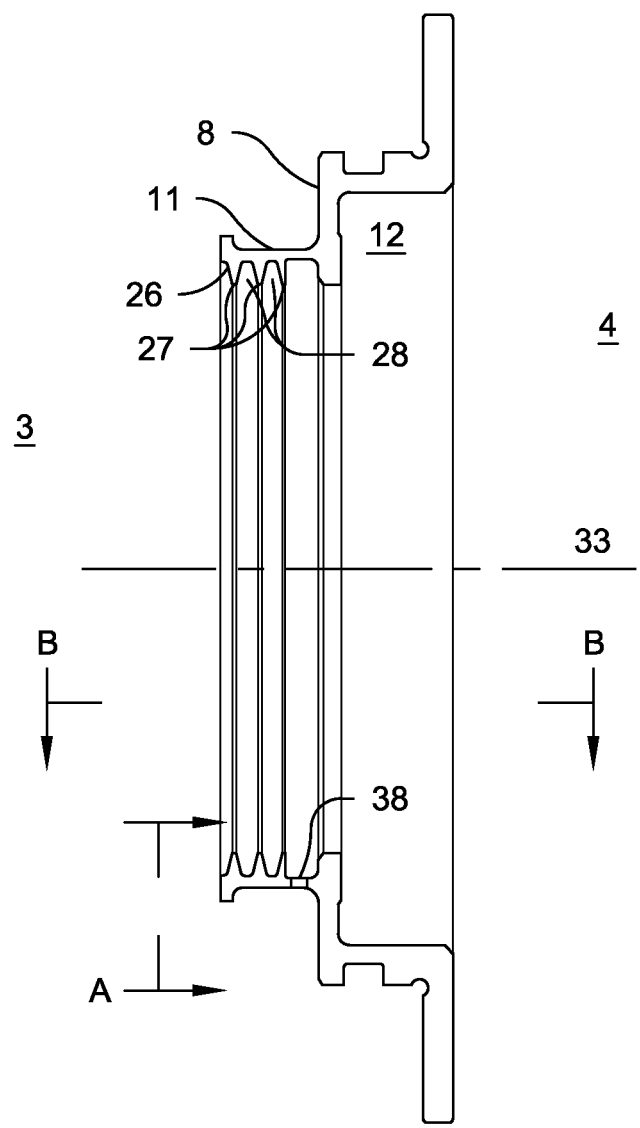
FIG. 3a is a cross section view illustrating an exemplary annular fluid seal housing in accordance with an embodiment of the invention.
Figure 3B:
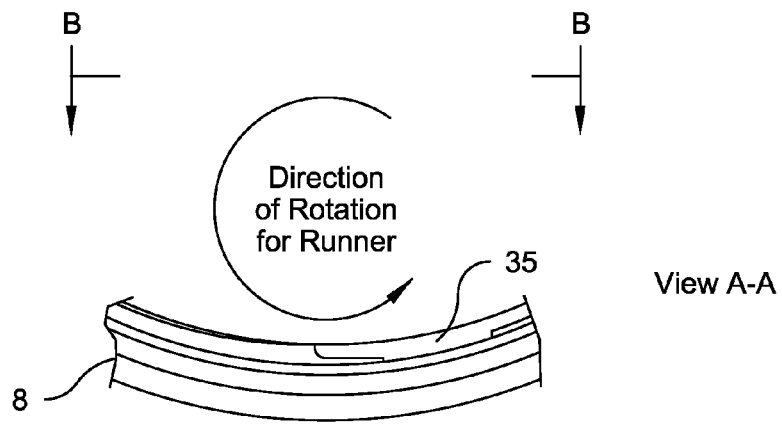
FIG. 3b is a side view illustrating the lubricant side end of the annular fluid seal housing in FIG. 3a in accordance with an embodiment of the invention.
Figure 3C:
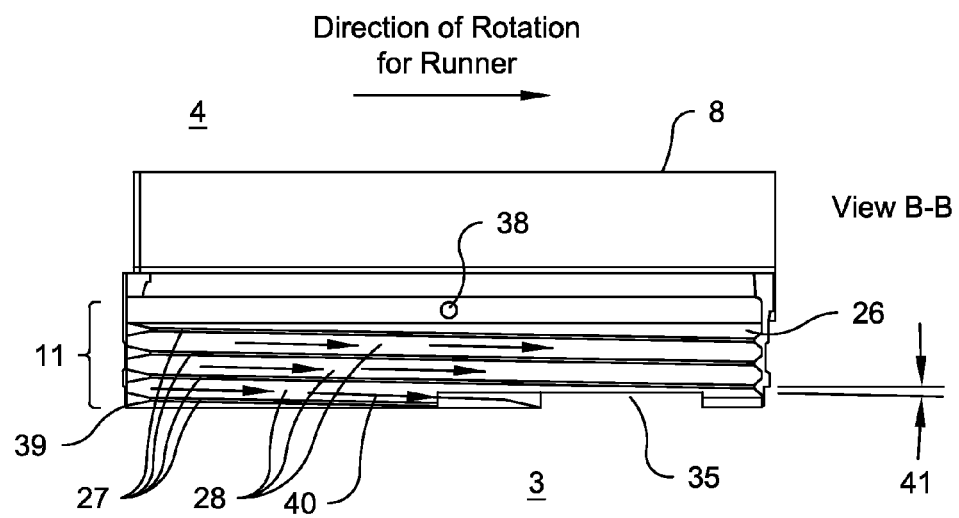
FIG. 3c is a view illustrating the bore of the annular fluid seal housing in FIG. 3a with a single continuous thread, formed by a single continuous channel about the circumference of the housing in an overlapping fashion in accordance with an embodiment of the invention.

In one exemplary embodiment, the inner face 26 of the annular collar 11 could include a single inclined thread 27 formed by a single channel 28 which completely circumscribes the inner face 26 one or more times about the circumference 39 of the annular collar 11, as illustrated in FIG. 3c. The inclined threads 27 and channels 28 are parallel and spaced apart so that the inclined threads 27 are disposed at a single pitch angle 41 with respect to the plane of rotation for the rotatable runner 5. It is understood that the plane of rotation for the rotatable runner 5 is perpendicular to the rotation axis 33 so that rotational motion of the rotatable runner 5 is about the rotational axis 33. The channel 28 could terminate with a leak-off slot 35 at the lubricant side 3 of the annular collar 11. A lubricant 31 disposed between the annular collar 11 and a rotatable runner 5 would travel along a single path dictated by the channel 28 and inclined thread 27 until the lubricant 31 reaches the leak-off slot 35 along the lubricant side 3, as represented by the flow arrows 40.

Figure 3D:
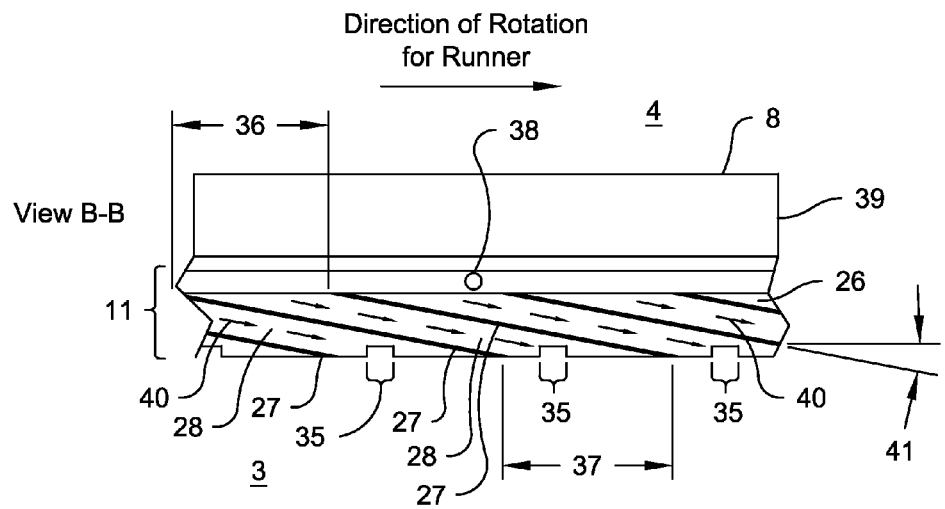
FIG. 3d is a view illustrating the bore of the annular fluid seal housing in FIG. 3a with a plurality of threads, formed by a plurality of uniform-width channels which separately overlap about the circumference of the housing in accordance with an embodiment of the invention.
Figure 3E:
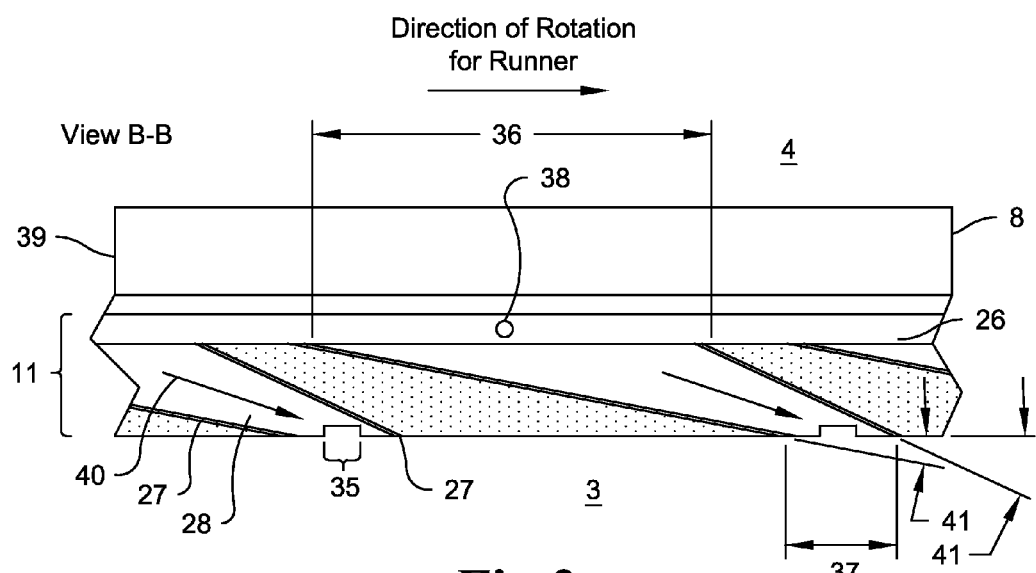
FIG. 3e is a view illustrating the bore of the annular fluid seal housing in FIG. 3a with a plurality of threads, formed by a plurality of non-uniform channels which separately overlap about the circumference of the housing in accordance with an embodiment of the invention.

In other exemplary embodiments, the inner face 26 of the annular collar 11 could include a plurality of inclined threads 27 and a plurality of channels 28 which at least partially circumscribe the inner face 26 about the circumference 39 of the annular collar 11, as illustrated in FIGS. 3d and 3e.

In FIG. 3d, the inclined threads 27 and channels 28 are parallel and spaced apart so that the inclined threads 27 are disposed at a single pitch angle 41 oriented at an oblique angle with respect to the plane of rotation for the rotatable runner 5. Adjacent inclined threads 27 and channels 28 at least partially overlap about at least a portion of the circumference 39 of the annular collar 11. The inlet width 36 is dimensionally the same as the outlet width 37 by virtue of the parallel spacing between adjacent inclined threads 27. Each channel 28 between two adjacent inclined threads 27 terminates with a leak-off slot 35 at the lubricant side 3. A lubricant 31 disposed between the annular collar 11 and a rotatable runner 5 could separately travel along two or more paths dictated by the separate channels 28, as represented by the parallel flow arrows 40, until the lubricant 31 reaches the respective leak-off slots 35.

In FIG. 3e, the inclined threads 27 are skewed, thus resulting in a spacing which varies along the length of the annular collar 11 between adjacent inclined threads 27. The result is pitch angles 41 which are oblique with respect to the plane of rotation for the rotatable runner 5 but differ between adjacent threads 27. The effective pitch angle 41 is the average of the two pitch angles 41 about an inclined thread 27. The inlet width 36 and outlet width 37 differ depending on the angular orientations of the adjacent inclined threads 27. In one example, the inlet width 36 is greater than the outlet width 37 when the inclined thread 27 to the left of a channel 28 is oriented at a pitch angle 41 less than the pitch angle 41 of the inclined thread 27 to the right of a channel 28, as illustrated in FIG. 3e. This arrangement may be advantageous when higher flow and velocity are required in the windback 9 adjacent to the lubricant side 3. In another example, the inlet width 36 could be less than the outlet width 37 when the inclined thread 27 to the left of a channel 28 is oriented at a pitch angle 41 greater than the pitch angle 41 of the inclined thread 27 to the right of a channel 28. This arrangement may be advantageous to restrict movement of oil away from the gas side 4 when a windback 9 is susceptible to a large amount of oil splash. A lubricant 31 disposed between the annular collar 11 and a rotatable runner 5 would travel along multiple paths provided by the inclined threads 27 and channels 28, as represented by the parallel flow arrows 40, until the lubricant 31 reaches the respective leak-off slots 35. To this end, one of ordinary skill in the art will appreciate that these considerations may be taken into account when determining the direction and angle of the inclined threads 27.

Figure 4A:
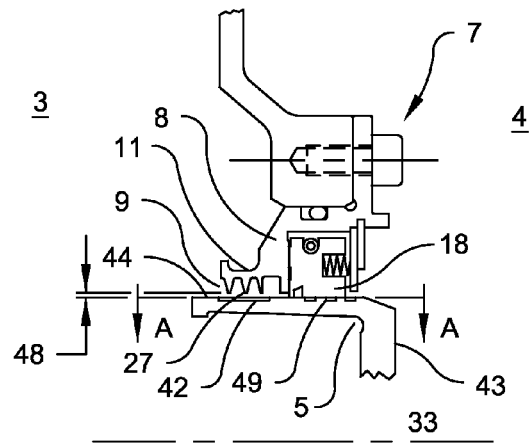
FIG. 4a is a cross section view illustrating an annular fluid seal housing with a windback device and a ring-shaped seal element disposed about a rotatable runner with inclined baffles along the outer circumferential surface of the rotatable runner under the windback device and further including optional inclined grooves along the rotatable runner under the seal element in accordance with an embodiment of the invention.
Figure 4B:
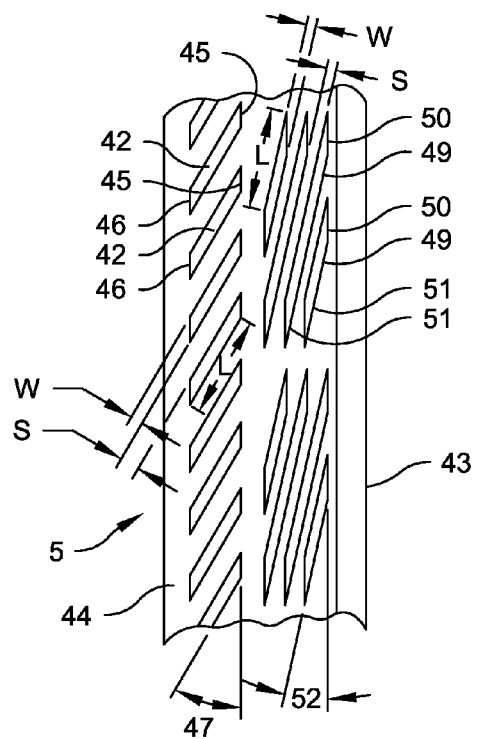
FIG. 4b is a view illustrating the outer circumferential surface of the rotatable runner in FIG. 4a with inclined baffles each having a first end and a second end which are equidistant from a vertical end of the rotatable runner and further including optional inclined grooves along the rotatable runner under the seal element in accordance with an embodiment of the invention.
Figure 4C:
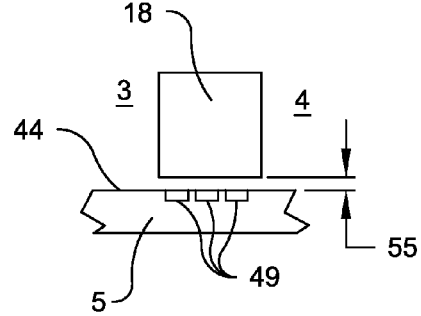
FIG. 4c is an enlarged cross section view illustrating a thin-film seal formed between the rotatable runner and the seal element in FIG. 4a when the rotatable runner rotates about a rotational axis in accordance with an embodiment of the invention.
Figure 5A:
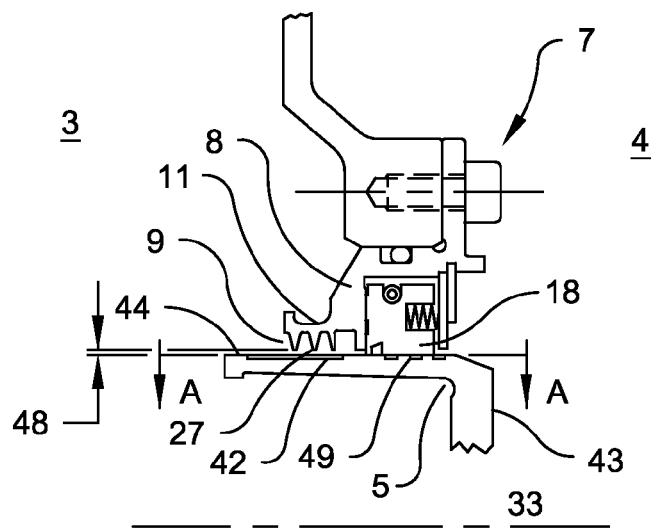
FIG. 5a is a cross section view illustrating an annular fluid seal housing with a windback and a ring-shaped seal element disposed about a rotatable runner with inclined baffles along the outer circumferential surface of the rotatable runner under the windback and further including optional inclined grooves along the rotatable runner under the seal element in accordance with an embodiment of the invention.
Figure 6A:
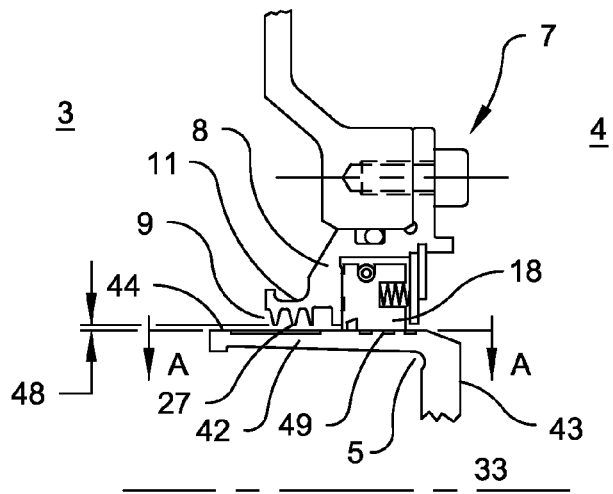
FIG. 6a is a cross section view illustrating an annular fluid seal housing with a windback and a ring-shaped seal element disposed about a rotatable runner with inclined baffles along the outer circumferential surface of the rotatable runner under the windback and further including optional inclined grooves along the rotatable runner under the seal element in accordance with an embodiment of the invention.

Referring now to FIGS. 4a, 5a, and 6a, the rotatable runner 5 is positioned within the bore along the fluid seal assembly 7. The rotatable runner 5 overlays both the windback 9 and the annular seal 18, the latter being a ring-shaped element composed of one or more segments which resides within and is separately movable with respect to the annular fluid seal housing 8. Inclined threads 27 along the windback 9 extend inward from the annular collar 11 toward the outer circumferential surface 44 of the rotatable runner 5. The inclined threads 27 are separated from the outer circumferential surface 44 by a radial clearance 48 so that the rotatable runner 5 is rotatable within the bore about the rotatable axis 33 without contacting the inclined threads 27. The radial clearance 48 may be the same for all inclined threads 27 or different for two or more inclined threads 27. The annular seal 18 is biased toward the rotatable runner 5, as described herein, so as to contact the outer circumferential surface 44 and sealingly engage the rotatable runner 5. In some embodiments, sealing contact between rotatable runner 5 and annular seal 18 is maintained as the rotatable runner 5 rotates with respect to the fluid seal assembly 7. In other embodiments, the annular seal 18 separates from the outer circumferential surface 44 when the rotatable runner 5 rotates resulting in a gap 55, as illustrated in FIG. 4c. A thin-film of pressurized gas from the gas side 4 could reside within the gap 55 so as to resist migration of lubricant 31 from the lubricant side 3 to the gas side 4 between the rotatable runner 5 and annular seal 18. The thin-film could be hydrostatically and/or hydrodynamically formed between the rotatable runner 5 and annular seal 18.

Figure 7A:
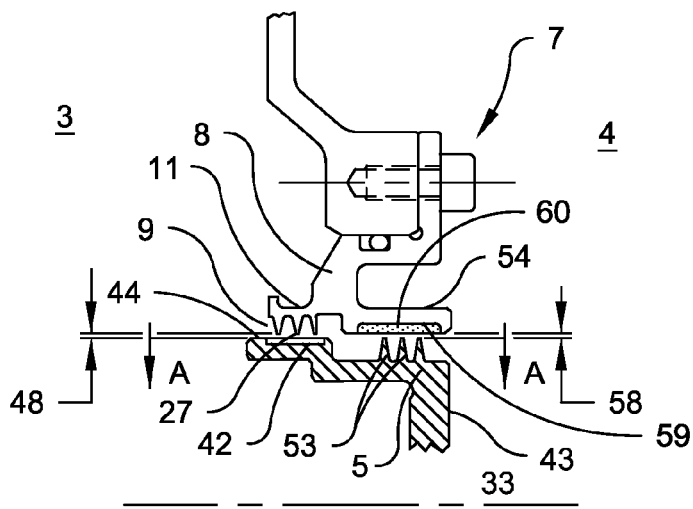
FIG. 7a is a cross section view illustrating an annular fluid seal housing with a windback and a collar-shaped seal element disposed about a rotatable runner with inclined baffles along the outer circumferential surface of the rotatable runner under the windback and further including optional labyrinth teeth along the rotatable runner under the seal element in accordance with an embodiment of the invention.
Figure 7B:
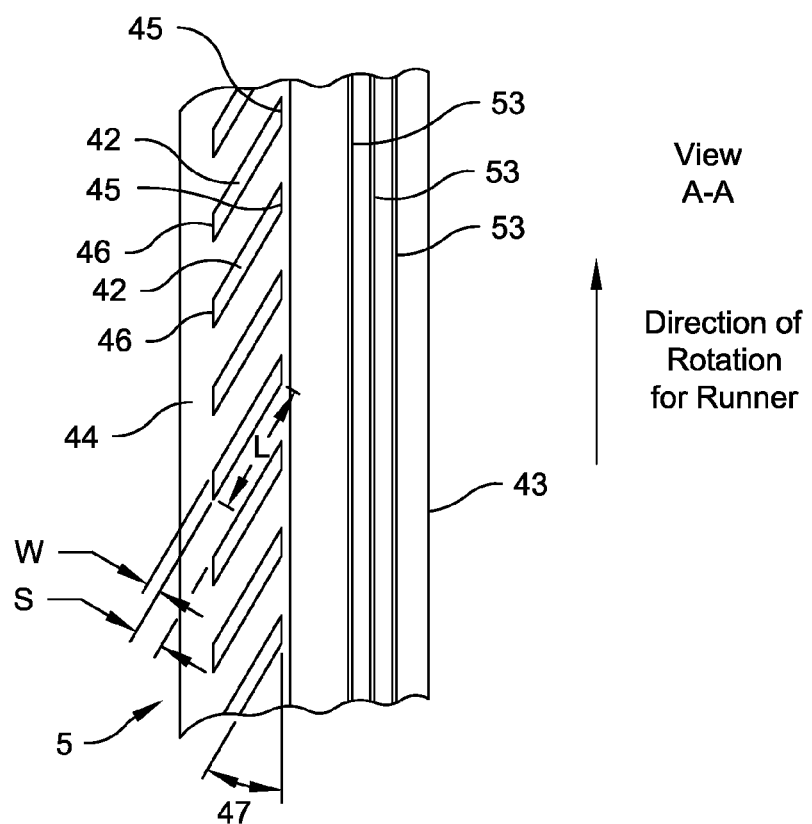
FIG. 7b is a view illustrating the outer circumferential surface of the rotatable runner in FIG. 7a with inclined baffles each with a first end and a second end which are equidistant from a vertical end of the rotatable runner and further including optional labyrinth teeth along the rotatable runner under the seal element in accordance with an embodiment of the invention.
Figure 8A:
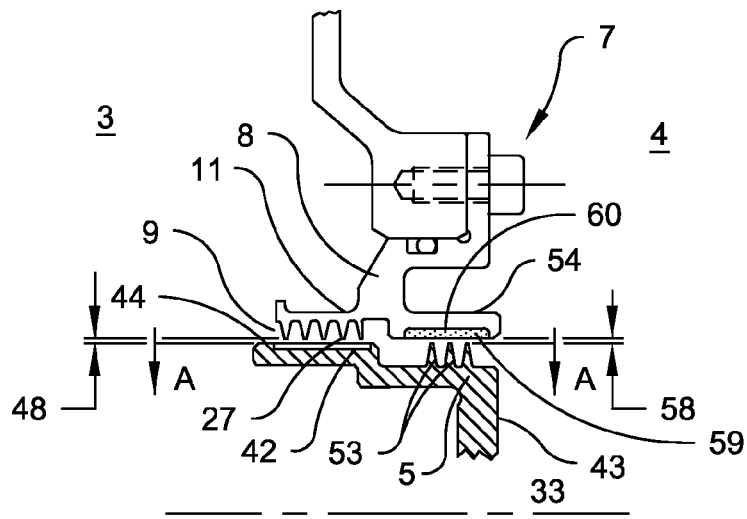
FIG. 8a is a cross section view illustrating an annular fluid seal housing with a windback and a collar-shaped seal element disposed about a rotatable runner with inclined baffles along the outer circumferential surface of the rotatable runner under the windback and further including optional labyrinth teeth along the rotatable runner under the seal element in accordance with an embodiment of the invention.
Figure 8B:
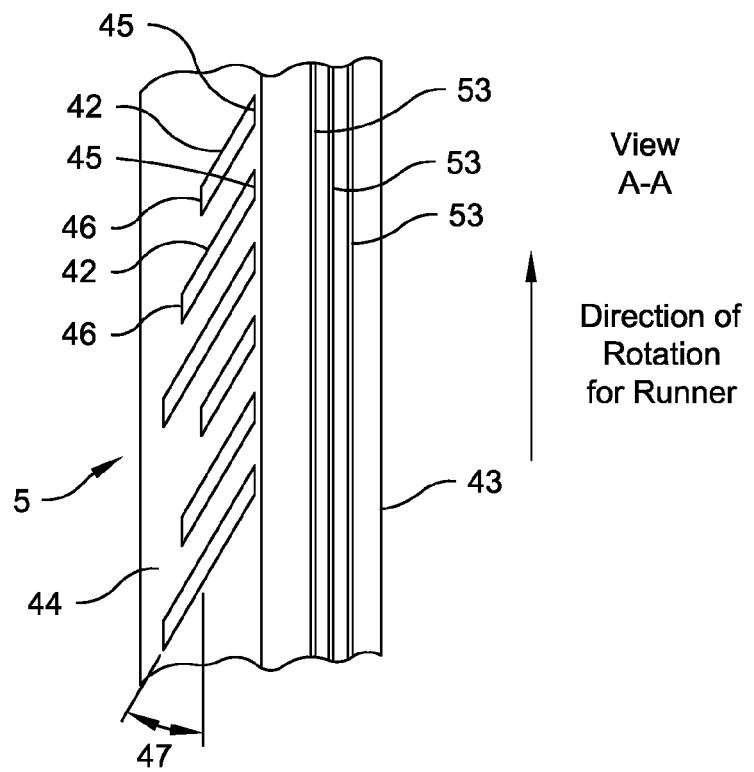
FIG. 8b is a view illustrating the outer circumferential surface of the rotatable runner in FIG. 8a with inclined baffles wherein the first ends of the baffles are equidistant from a vertical end of the rotatable runner and the second ends of the baffles are non-equidistant from the vertical end of the rotatable runner and further including optional labyrinth teeth along the rotatable runner under the seal element in accordance with an embodiment of the invention.
Figure 9A:
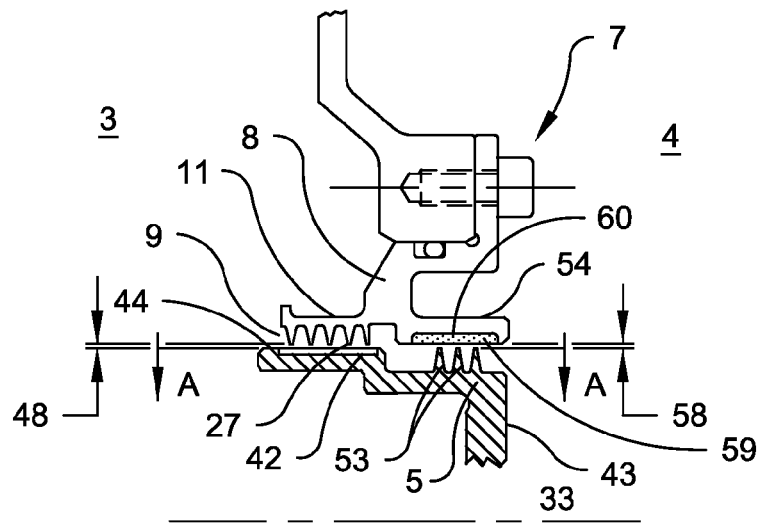
FIG. 9a is a cross section view illustrating an annular fluid seal housing with a windback and a collar-shaped seal element disposed about a rotatable runner with inclined baffles along the outer circumferential surface of the rotatable runner under the windback and further including optional labyrinth teeth along the rotatable runner under the seal element in accordance with an embodiment of the invention.

Referring now to FIGS. 7a, 7b, 8a, 8b, 9a, and 9b, the rotatable runner 5 is positioned within the bore along the fluid seal assembly 7. The rotatable runner 5 overlays both the windback 9 and the annular seal 54, the latter being a collar-shaped element which is fixed to and extends from the annular fluid seal housing 8 substantially parallel to the outer circumferential surface 44 of the rotatable runner 5. Inclined threads 27 along the windback 9 extend inward from the annular collar 11 toward the outer circumferential surface 44 of the rotatable runner 5. The inclined threads 27 are separated from the outer circumferential surface 44 by a radial clearance 48 so that the rotatable runner 5 is rotatable within the bore about the rotatable axis 33 without contacting the inclined threads 27. The rotatable runner 5 could include one or more optional labyrinth teeth 53 biased toward to the gas side 4 and disposed about the rotatable runner 5 to form separate ring-shaped elements which extend radially outward from the outer circumferential surface 44 of the rotatable runner 5 toward the collar-shaped annular seal 54. The ends of the labyrinth teeth 53 are separated from the inner diameter of the annular seal 54 by a radial clearance 58 so that the rotatable runner 5 is rotatable within the bore about the rotatable axis 33 without contacting the annular seal 54. In some embodiments, the annular seal 54 could have an abradable coating 60, one example including but not limited to nickel graphite, applied to the inner surface 59 thereof, preferably into an annular pocket along the annual seal 54 as represented in FIGS. 7a, 8a, and 9a, which allows the labyrinth teeth 53 to wear into if contact occurs due to thermal expansion or eccentric rotation of the rotatable runner 5. The radial clearance 58 may or may not be equal to the radial clearance 48. Further, the radial clearance 58 may be the same for all labyrinth teeth 53 or vary along the labyrinth teeth 53. In some embodiments, the inner surface 59 could include one or more recesses or channel-like features which interact with the labyrinth teeth 53 without contact when the rotatable runner 5 rotates so as to sealingly engage the rotatable runner 5 to the annular seal 54. In other embodiments, the inner surface 59 could include labyrinth teeth 53 (not illustrated) which extend from and inward toward the rotatable runner 5. The opposed sets of labyrinth teeth 53 could be arranged in an interdigitated fashion so as to sealingly engage the rotatable runner 5 to the annular seal 54 without contact between the labyrinth teeth 53 along the rotatable runner 5 and the labyrinth teeth 53 along the annular seal 54. The sealing engagement afforded by the labyrinth teeth 53 resists migration of lubricant 31 from the lubricant side 3 to the gas side 4 between the rotatable runner 5 and annular seal 54.

Referring now to FIGS. 4b, 5b, 6b, 7b, 8b, and 9b, the rotatable runner 5 includes a plurality of inclined baffles 42 which separately reside along the outer circumferential surface 44 of the rotatable runner 5. Each inclined baffle 42 includes a first end 45 and a second end 46. The inclined baffles 42 are arranged along the outer circumferential surface 44 at a baffle angle 47 with respect to the plane of rotation for the rotatable runner 5. In order to ensure proper flow with respect to the inclined baffles 42, the inclined baffles 42 are oriented at an oblique angle with respect to the plane of rotation for the rotatable runner 5. The inclined baffles 42 could be oriented at one or more baffle angles 47. Also the baffles angles 47 may or may not be the same as the pitch angles 41. In some embodiments, the inclined baffles 42 could be arranged so that the first end 45 of one inclined baffle 42 overlaps a second end 46 of an adjacent inclined baffle 42. In other embodiments, the first end 45 and the second end 46 between adjacent inclined baffles 42 could be arranged with or without a gap or space, the latter forming an end-to-end configuration without contact between adjacent inclined baffles 42.

The inclined baffles 42 are generally illustrated as a parallelogram with a length-to-width (L-to-W) ratio greater than one; however, other shapes and designs are possible. In one example, the inclined baffles 42 could include non-linear and/or non-parallel sides disposed along the length L between the first and second ends 45, 46. In other example, the first and second ends 45, 46 could be nonlinear and/or non-parallel rather than the truncated configuration illustrated herein.

Figure 5B:
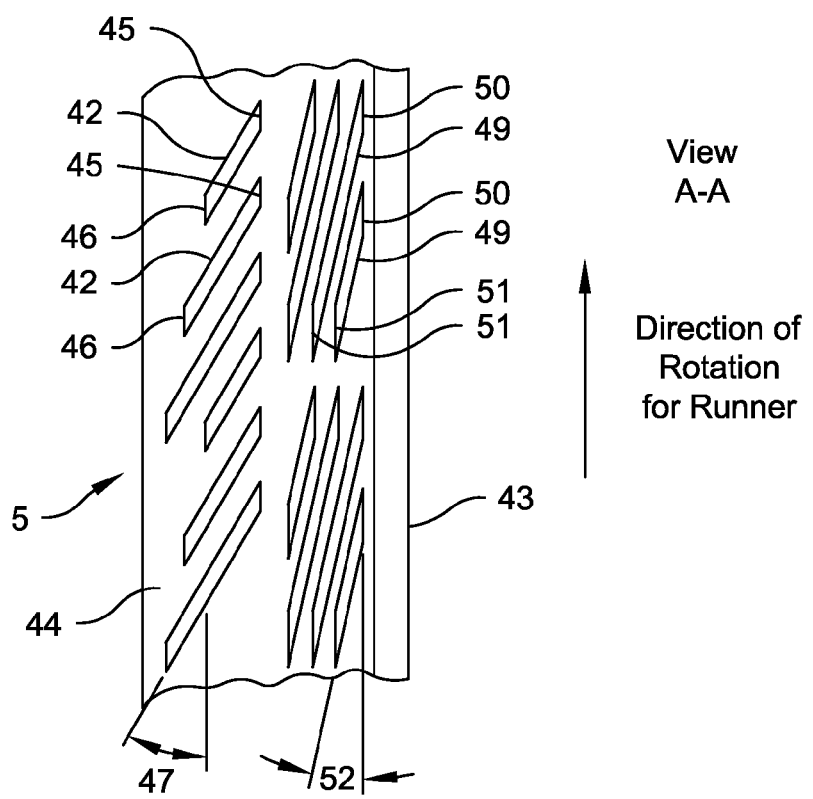
FIG. 5b is a view illustrating the outer circumferential surface of the rotatable runner in FIG. 5a with inclined baffles wherein the first ends of the baffles are equidistant from a vertical end of the rotatable runner and the second ends of the baffles are non-equidistant from the vertical end of the rotatable runner and further including optional inclined grooves along the rotatable runner under the seal element in accordance with an embodiment of the invention.
Figure 6B:
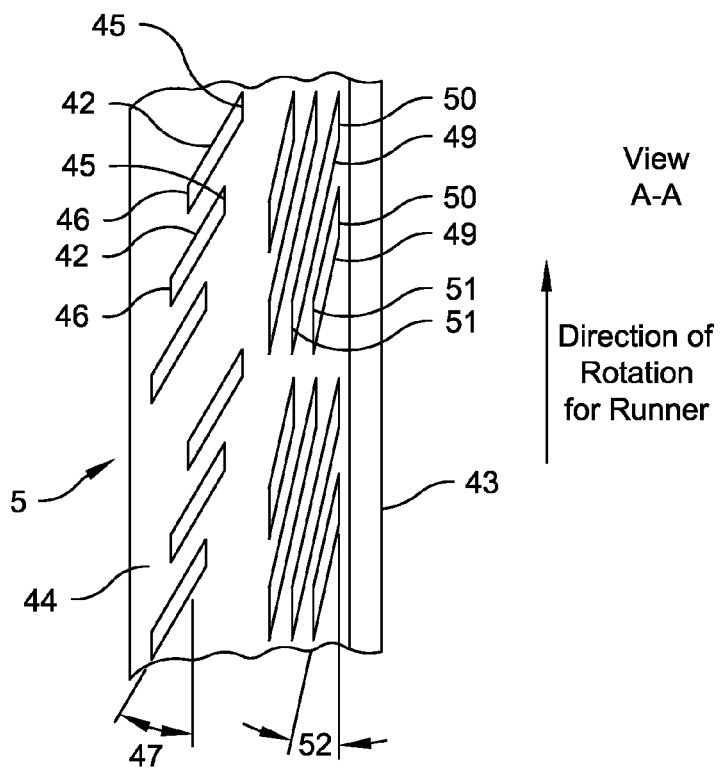
FIG. 6b is a view illustrating the outer circumferential surface of the rotatable runner in FIG. 6a with inclined baffles wherein the first ends of the baffles are non-equidistant from a vertical end of the rotatable runner and the second ends of the baffles are non-equidistant from the vertical end of the rotatable runner and further including optional inclined grooves along the rotatable runner under the seal element in accordance with an embodiment of the invention.
Figure 9B:
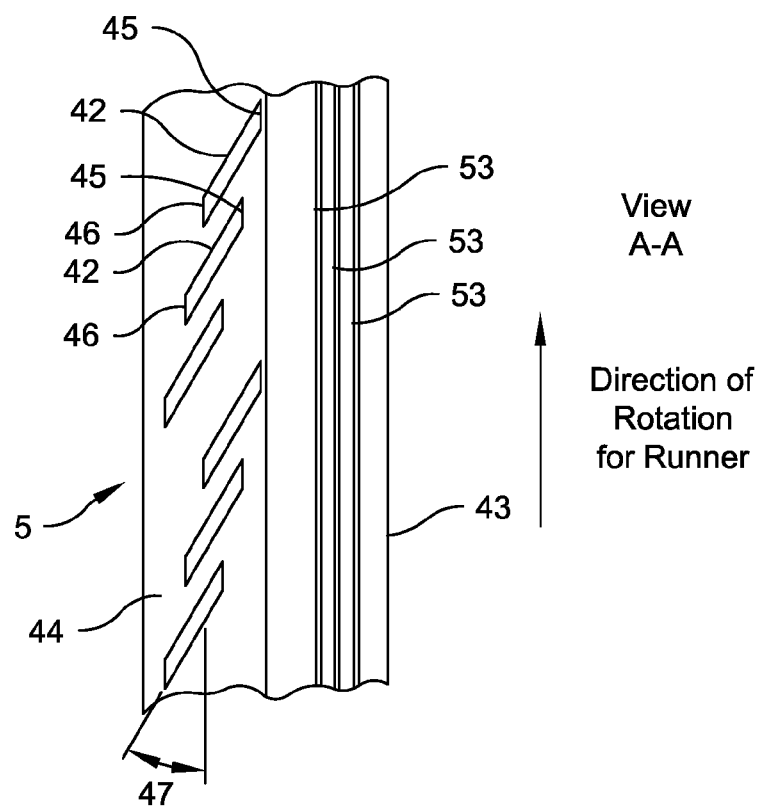
FIG. 9b is a view illustrating the outer circumferential surface of the rotatable runner in FIG. 9a with inclined baffles wherein the first ends of the baffles are non-equidistant from a vertical end of the rotatable runner and the second ends of the baffles are non-equidistant from the vertical end of the rotatable runner and further including optional labyrinth teeth along the rotatable runner under the seal element in accordance with an embodiment of the invention.

The length L and width W of the inclined baffles 42, as well as spacing S and angular orientation thereof, are application dependent based on such exemplary variables as rotation speed and size of the rotatable runner 5, design of the windback 9, pressure differential between the lubricant side 3 and gas side 4, and type and design of the annular seals 18 and 54. In some embodiments, the inclined baffles 42 could be arranged in a uniform pattern whereby the length L, width W, spacing S, and baffle angle 47 are the same so that the first ends 45 are equidistant from a vertical end 43 along the rotatable runner 5 and the second ends 46 are equidistant from the same vertical end 43 although offset from first ends 45, as illustrated in FIGS. 4b and 7b. In other embodiments, the inclined baffles 42 could be arranged in a uniform pattern whereby the width W, spacing S, and baffle angle 47 are the same and the lengths L are varied so that the first ends 45 are equidistant from a vertical end 43 along the rotatable runner 5 and the second ends 46 terminate at different distances from the vertical end 43, as illustrated in FIGS. 5b and 8b. It is also possible for the first ends 45 to be non-equidistant from a vertical end 43 and the second ends 46 equidistant from a vertical end 43. The inclined baffles 42 could be arranged into sets consisting of two or more inclined baffles 42 separately disposed about the outer circumferential surface 44 in a repeating pattern, one example of which is a set of three inclined baffles 42 as illustrated in FIGS. 5b and 8b. In other embodiments, the inclined baffles 42 could be arranged in a uniform pattern whereby the length L, width W, spacing S, and baffle angle 47 are the same so that the first ends 45 are non-equidistant from a vertical end 43 along the rotatable runner 5 and the second ends 46 terminate at different distances from the vertical end 43, as illustrated in FIGS. 6b and 9b. It is also possible for the first ends 45 to be non-equidistant from a vertical end 43 and the second ends 46 equidistant from a vertical end 43. The inclined baffles 42 could be arranged into sets consisting of two or more inclined baffles 42 separately disposed about the outer circumferential surface 44 in a repeating pattern, one example of which is a set of three inclined baffles 42 as illustrated in FIGS. 6b and 9b. It is understood that reference to a vertical end 43 is for illustrative purposes only and that other readily identifiable features along the rotatable runner 5 or another component described herein could be used to describe the relative placement of first and second ends 45, 46. In view of the above, one of ordinary skill in the art will appreciate that an infinite combination of lengths L, widths W, spacings S, angle orientations, and placements with respect to a common reference are possible.

The inclined baffles 42 are positioned along the outer circumferential surface 44 so as to overlay the windback 9 so that the inclined baffles 42 are disposed between the windback 9 and the rotatable runner 5. In some embodiments, the first and second ends 45, 46 are positioned between the beginning and end of the windback 9 so as to at least partially overlay the windback 9, as generally illustrated in FIGS. 4b and 7b. In other embodiments, some or all second ends 46 could extend beyond the windback 9 in the direction of the lubricant side 3, the former generally illustrated in FIGS. 5b, 6b, 8b, and 9b. In yet other embodiments, it possible for the some or all first ends 45 to extend beyond the windback 9 in the direction of the gas side 4. The latter two embodiments could be advantageous to ensure proper function of the inclined baffles 42 during large translations between the rotatable runner 5 and fluid seal assembly 7. In view of the above, it is understood that at least a portion of each inclined baffle 5 should overlay at least a portion of the windback 9.

Figure 10A:
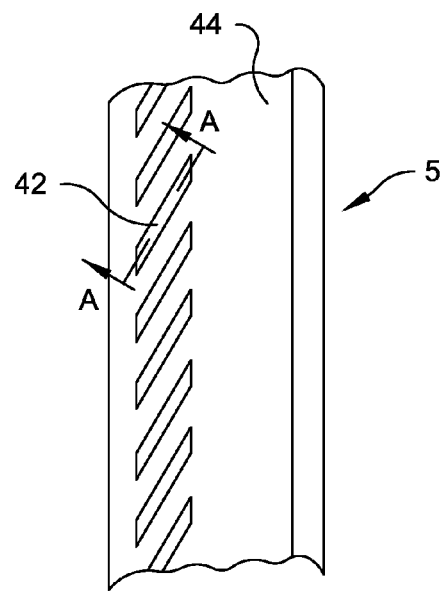
FIG. 10a is a view illustrating the outer circumferential surface of a rotatable runner with inclined baffles thereon in accordance with an embodiment of the invention.
Figure 10B:
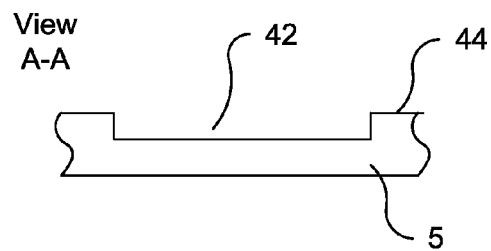
FIG. 10b is an enlarged cross section view illustrating a channel-shaped inclined baffle recessed along the rotatable runner in FIG. 10a in accordance with an embodiment of the invention.
Figure 10C:
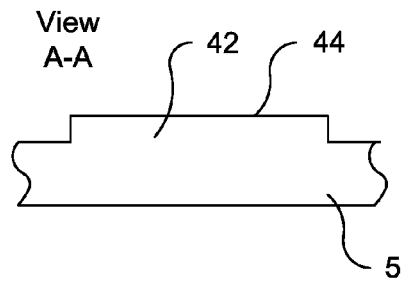
FIG. 10c is an enlarged cross section view illustrating a raised step-shaped inclined baffle extending from the rotatable runner in FIG. 10a in accordance with an embodiment of the invention.

Referring now to FIGS. 10a-10c, the inclined baffles 42 may include both recess and step-like structures. In some embodiments, it could be advantageous to have inclined baffles 42 disposed along a rotatable runner 5 in a recessed arrangement along the outer circumferential surface 44, as illustrated in FIG. 10b. In these embodiments, the inclined baffles 42 could be channels, flutes, or depressions into the outer circumferential surface 44 of the rotatable runner 5. The bottom of each inclined baffle 44 is surrounded by material comprising the rotation runner 5. As such, the inclined baffles 44 communicate with the lubricant side 3 as described for the inclined threads 27 and channels 28. In such embodiments, the radial clearance 48 illustrated in FIGS. 4a, 5a, 6a, 7a, 8b, and 9a is the distance between the outer circumferential surface 44 of the rotatable runner 5 and the end of the inclined threads 27 adjacent to the structure forming the inclined baffle 42. In other embodiments, it could be advantageous for the inclined baffles 42 to extend radially outward from the outer circumferential surface of a rotatable runner 5, as illustrated in FIG. 10c. The radial clearance 48 illustrated in FIGS. 4a, 5a, 6a, 7a, 8a, and 9a is the distance between the outer circumferential surface 44 along the outermost surface along the inclined baffle 42 and the end of the inclined threads 27 immediately adjacent to the inclined baffle 42.

Referring again to FIGS. 4b, 5b, and 6b, the outer circumferential surface 44 could further include a plurality of optional inclined grooves 49 when direct and sustained contact between the annular seal 18 and rotatable runner 5 is not required during operation of a turbine engine. The inclined grooves 49 are positioned along the outer circumferential surface 44 so as to at least partially overlay the ring-shaped annular seal 18. Each inclined groove 49 is a channel-like feature or depression recessed below the outer circumferential surface 44 of the rotatable runner 5, such as the grooves described in U.S. Pat. Nos. 7,931,277, 7,963,525, and 8,091,898 entitled Hydrodynamic Circumferential Seal System for Large Translations, which are incorporated in their entirety herein by reference thereto.

Each inclined groove 49 includes an inlet end 50 toward the gas side 4 and an outlet end 51 toward the lubricant side 3. In some embodiments, two or more inlet ends 50 could be arranged along the outer circumferential surface 44 at the same or different distances from a vertical end 43 along the rotatable runner 5, as illustrated in FIGS. 4b, 5b, and 6b. In other embodiments, two or more outlet ends 51 could be arranged along the outer circumferential surface 44 at the same or different distances from a vertical end 43 along the rotatable runner 5, as illustrated in FIGS. 4b, 5b, and 6b. Again, it is understood that reference to a vertical end 43 is for illustrative purposes only and that other readily identifiable features along the rotatable runner 5 or another component described herein could be used to describe the relative placement of the inlet and outlet ends 50, 51.

The inclined grooves 49 are arranged along the outer circumferential surface 44 at a groove angle 52 with respect to the plane of rotation for the rotatable runner 5. In order to ensure proper flow with respect to the inclined grooves 49, the inclined grooves 49 are oriented at an oblique angle with respect to the plane of rotation for the rotatable runner 5. The values of the groove angle 52 could be the same as or different from the baffle angles 47. In some embodiments, the inclined grooves 49 could be arranged so that the inlet end 50 of one inclined grooves 49 overlaps an outlet end 51 of an adjacent inclined groove 49. In other embodiments, the inlet end 50 and outlet end 51 between adjacent inclined grooves 49 could be arranged with or without a gap, the latter forming an end-to-end configuration without contact between adjacent inclined grooves 49.

The inclined grooves 49 communicate gas from the gas side 4 to the interface between the annular seal 18 and the rotatable runner 5. Inlet ends 50 allow the gas to enter the inclined grooves 49 after which the gas is pushed or pumped along by rotation of the rotatable runner 5. At or near the outlet ends 51, the higher pressure gas impinges the annular seal 18. The annular seal 18 separates from outer circumferential surface 44 of the rotatable runner 5, as illustrated by the gap 55 in FIG. 4c, when the forces imposed by the gas onto the annular seal 18 are sufficient to overcome the inward forces acting on the annular seal 18. The resultant thin-film of gas resists lubricant flow across the interface between the annular seal 18 and the rotatable runner 5. The annular seal 18 is reseated along the rotatable runner 5 when the rotatable runner 5 stops rotating.

The inclined grooves 49 are generally shown as a parallelogram with a length-to-width (L-toW) ratio greater than one; however, other shapes and designs are possible. In some examples, the inclined grooves 49 could include non-linear and/or non-parallel sides disposed between the inlet and outlet ends 50, 51. In other examples, the inlet and outlet ends 50, 51 could be nonlinear and/or non-parallel rather than the truncated design illustrated in FIGS. 4b, 5b, and 6b.

The length L and width W of the inclined grooves 49, as well as spacing S and angular orientation thereof, are application dependent based on such exemplary variables as rotation speed and size of the rotatable runner 5, design of the windback 9, pressure differential between the lubricant side 3 and gas side 4, and type and design of the annular seal 18. The inclined grooves 49 could be arranged into sets consisting of two or more inclined grooves 49 separately disposed about the outer circumferential surface 44 in a repeating pattern, one example of which is a set of four inclined grooves 49 as illustrated in FIGS. 4b, 5b, and 6b.

As discussed herein, pitch angles 41, baffle angles 47, and groove angles 52 are oblique with respect to the plane of rotation for the rotatable runner 5. The value of a baffle angle 47 may be greater than, less than, or equal to the value of a groove angle 52. In preferred embodiments, the baffle angles 47 are greater than the groove angles 52 in order to ensure sufficient cross flow between the annular seal 18 and rotatable runner 5 and windback 9 and rotatable runner 5. The value of a baffle angle 47 may be greater than, less than, or equal to the value of a pitch angle 41. In preferred embodiments, the baffle angles 47 are greater than the pitch angles 41 in order to ensure sufficient counter flow between the windback 9 and rotatable runner 5. In view of the above, one of ordinary skill in the art will appreciate that an infinite combination of length L, width W, spacing S, angle orientation, and arrangement with respect to a common reference are possible.

Referring now to FIG. 11a, a rotatable runner 5 is often cooled by injecting lubricant 31 into the lubricant side 3 of a turbine engine via an injection nozzle 30 or the like. Typically, lubricant 31 is sprayed onto the inside of a rotatable runner 5 to avoid direct injection into the space between a windback 9 and the rotatable runner 5. When the lubricant 31 contacts the rotatable runner 5 it moves along the surface of the rotatable runner 5 eventually reaching the outer circumferential surface 44, as illustrated by the flow 56 in FIG. 11a. For reasons discussed herein, the flow 56 progresses along the outer circumferential surface 44 toward the annular seal 18, 54. The inclined baffles 42 and the windback 9 create a counter flow 57 moving or pumping lubricant 31 away from the annular seal 18, 54.

Windage created by rotation of the rotatable runner 5 splashes lubricant 31 onto the inclined threads 27 of the windback 9. The shear forces resulting from rotation of the rotatable runner 5 urge the lubricant 31 along the inclined threads 27. Due to the pitch angle 41 of the inclined threads 27, the lubricant 31 is generally directed away from the annular seal 18, 54 and toward the respective leak-off slot 35 of each inclined thread 27. To this end, the lubricant 31 is urged through the leak-off slots 35 and back into the lubricant side 3. Accordingly, the inclined threads 27 prevent the lubricant 31 from contacting the annular seal 18, 54 and/or escaping the lubricant side 3. However, this process is not completely efficient and lubricant 31 over time reaches the annular seal 18, 54 and is lost to the gas side 4. As such, turbine engines are designed to include a sump which ensures adequate lubricant 31 for a specific operational time based on a leakage or lose rate for the lubricant 31.

Figure 11D:
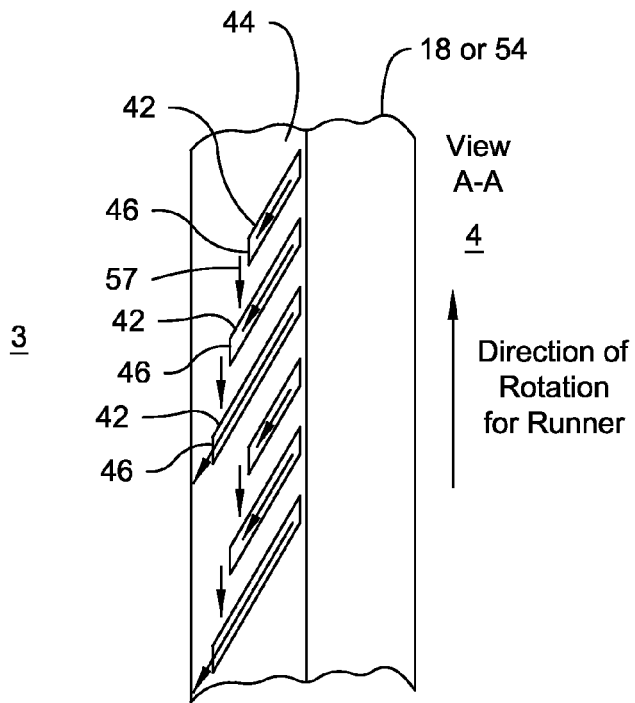
FIG. 11d is a view illustrating exemplary counter flow patterns for the lubricant across the rotatable runner in FIG. 11a when the inclined baffles are recessed and staggered along the outer circumferential surface in accordance with an embodiment of the invention.
Figure 11E:
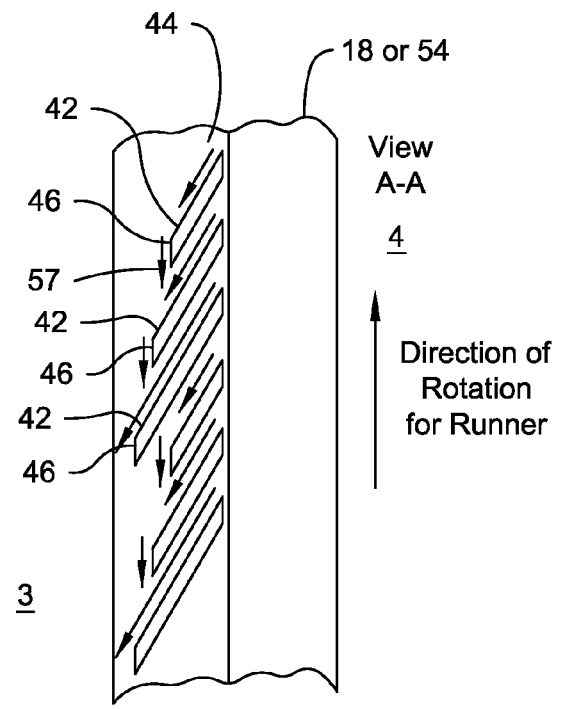
FIG. 11e is a view illustrating exemplary counter flow patterns for the lubricant across the rotatable runner in FIG. 11a when the raised inclined baffles extend above and are staggered along the outer circumferential surface in accordance with an embodiment of the invention.

Referring now to FIGS. 11b and 11c, inclined baffles 42 facilitate mechanisms which supplement or enhance a windback 9. In one such mechanism, lubricant 31 within the lubricant side 3 enters the inclined baffles 42 when recessed or is channeled between inclined baffles 42 when extended via the windage formed between the stationary windback 9 and rotating rotatable runner 5. The lubricant 31 travels along the inclined baffles 42 in FIG. 11b or between the inclined baffles 42 in FIG. 11c facilitated by the pumping effect associated with the oblique arrangement between the inclined baffles 42 and the plane of rotation for the rotatable runner 5. The result is a counter flow 57 which complements the counter flow 57 created by the windback 9. It is also possible for the counter flows 57 to interact between the windback 9 and inclined baffles 42 to enhance the overall counter flow 57 otherwise achievable by the separate flows. In another such mechanism, gas within the lubricant side 3, which may or may not be communicated to the lubricant side 3 by the optional inclined grooves 49, enters the inclined baffles 42 when recessed as illustrated in FIG. 11b or is channeled between raised inclined baffles 42 when extended as illustrated in FIG. 11c and moves away from the annular seal 18, 54 via the pumping action associated with the oblique arrangement of the inclined baffles 42. The interaction between inclined baffles 42 and the gas could increase the circular velocity of the gas. The moving gas could be communicated onto the inclined threads 27 of the windback 9 at or near the second end 46 of each inclined baffle 42 so as to increase the velocity of the lubricant 31 within the windback 9. In yet another mechanism, the counter flow 57 could cascade from one inclined baffle 42 to another inclined baffle 42 when offset as illustrated in FIGS. 11d and 11e. In FIG. 11d, lubricate or gas could enter one inclined baffle 42 when recessed and exit the second end 46 thereafter passing along the outer circumferential surface 44 and then all or a portion of the lubricant 31 or gas entering a second inclined baffle 42. The lubricant 31 or gas would repeat this counter flow 57 pattern until the lubricant or gas is returned to the lubricant side 3. In FIG. 11e, lubricate or gas could pass along one side of one inclined baffle 42 when extended to the second end 46 thereafter passing along the outer circumferential surface 44 and then all or a portion of the lubricant 31 or gas passing along a side of an adjacent inclined baffle 42. The lubricant 31 or gas would repeat this counter flow 57 pattern until the lubricant 31 or gas is returned to the lubricant side 3.

In some embodiments, the counter flow 57 might alter the pressure between the windback 9 and rotatable runner 5 or between the windback 9 and annular seal 18, 54 so as to diminish or impede sustained function of the windback 9 and/or inclined baffles 42. The annular fluid seal housing 8 could include one or more holes 38 disposed radially through the annular fluid seal housing 8 as illustrated in FIGS. 3a and 3c-3e. Each hole 38 traverses the thickness of the annular fluid seal housing 8 between the inner and outer diameters of the annular fluid seal housing 8. Holes 38 could be positioned at one or more locations, preferably at or near the beginning of the inclined threads 27 adjacent to the annular seal 18, 54. The location and size of each hole 38 should minimize flow of lubricant 31 into the space between the rotatable runner 5 and the annular collar 11. In view of the above, it is understood that each hole 38 should allow gas, rather than lubricant 31, from the lubricant side 3 immediately outside the annular fluid seal housing 8 to enter the region formed by the rotatable runner 5, annular seal 18, 54, and annular collar 11 for eventual communication into or between the inclined baffles 42. In preferred embodiments, the holes 38 should be positioned at the bottom of the annular fluid seal housing 8 so that lubricant 31 drains out of annular fluid seal housing 8 and away from the annular seal 18. In some embodiments, gas flow through the holes 38 could assist flow over or through the inclined baffles 42.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A method of sealing a lubricant side from a gas side across a circumferential seal to prevent a lubricant from contacting an annular seal comprising the steps of:
   (a) moving said lubricant back toward said lubricant side via at least one inclined thread along an inner surface of a windback defined at least in part by said at least one inclined thread and disposed between said lubricant side and said annular seal, said moving step induced by sheer forces along said at least one inclined thread during rotation of a rotating sealing surface adjacent to said windback, wherein said at least one inclined thread is located adjacent to said rotating sealing surface; and
   (b) increasing a velocity of said lubricant within said at least one inclined thread in a direction of said lubricant side via interaction between said lubricant and a gas, said gas directed onto said lubricant within said at least one inclined thread via a plurality of inclined baffles separately disposed along said rotating sealing surface immediately adjacent to said at least one inclined thread of said windback, said inclined baffles disposed at an angle with respect to said at least one inclined thread, and a plurality of inclined grooves disposed along said rotating sealing surface inclined at an angle different than said inclined baffles.

2. The method of claim 1, further comprising the step of:
   (c) increasing a circular velocity of said gas via interaction between said gas and at least two inclined baffles of said plurality of inclined baffles.

3. The method of claim 1, further comprising the step of:
   (c) cascading said gas from one said inclined baffle to another said inclined baffle of said plurality of inclined baffled.

4. The method of claim 1, further comprising the step of:
   (c) cascading an other lubricant from one inclined baffle of said plurality of inclined baffles to another inclined baffle of said plurality of inclined baffles.

5. The method of claim 1, wherein said inclined baffles of said plurality of inclined baffles are each recessed along said rotating sealing surface.

6. The method of claim 1, wherein said inclined baffles of said plurality of inclined baffles each extend from said rotating sealing surface.

7. The method of claim 1, wherein said inclined baffles of said plurality of inclined baffles are each offset.

8. The method of claim 1, further comprising the steps of:
   (c) allowing said gas to pass through at least one hole disposed along a housing of said annular seal at one end of said windback; and
   (d) passing said gas between said windback and said rotating sealing surface.

9. The method of claim 8, further comprising the step of:
   (e) draining said lubricant via said at least one hole.

10. A method of sealing a lubricant side from a gas side across a circumferential seal to prevent a lubricant from contacting an annular seal comprising the steps of:
    (a) moving said lubricant back toward said lubricant side via at least one inclined thread along an inner surface of a windback defined at least in part by said at least one inclined thread and disposed between said lubricant side and said annular seal, said moving step induced by sheer forces along said at least one inclined thread during rotation of a rotating sealing surface adjacent to said windback, wherein said at least one inclined thread is located adjacent to said rotating sealing surface; and
    (b) increasing a velocity of said lubricant within said at least one inclined thread in a direction of said lubricant side via interaction between said lubricant and an other lubricant, said other lubricant directed onto said lubricant within said at least one inclined thread via a plurality of inclined baffles separately disposed along said rotating sealing surface immediately adjacent to said at least one inclined thread of said windback, said inclined baffles disposed at an angle with respect to said at least one inclined thread, and a plurality of inclined grooves disposed along said rotating sealing surface inclined at an angle different than said inclined baffles.

11. The method of claim 10, further comprising the step of:
    (c) increasing a circular velocity of a gas via interaction between said gas and at least two inclined baffles of said plurality of inclined baffles.

12. The method of claim 10, further comprising the step of:
    (c) increasing a circular velocity of said other lubricant via interaction between said other lubricant and two or more inclined baffles of said plurality of inclined baffles.

13. The method of claim 10, further comprising the step of:
    (c) cascading said other lubricant from one inclined baffle of said plurality of inclined baffles to another inclined baffle of said plurality of inclined baffles.

14. The method of claim 10, wherein said inclined baffles of said plurality of inclined baffles are each recessed along said rotating sealing surface.

15. The method of claim 10, wherein said inclined baffles of said plurality of inclined baffles each extend from said rotating sealing surface.

16. The method of claim 10, wherein said inclined baffles of said plurality of inclined baffles are each offset.

17. The method of claim 10, further comprising the steps of:
    (c) allowing a gas to pass through at least one hole disposed along a housing of said annular seal at one end of said windback; and
    (d) passing said gas between said windback and said rotating sealing surface.

18. The method of claim 17, further comprising the step of:
    (e) draining said lubricant via said at least one hole.

* * * * *